United States Patent
Gin et al.

(10) Patent No.: US 11,046,826 B2
(45) Date of Patent: Jun. 29, 2021

(54) NANOPOROUS LYOTROPIC LIQUID CRYSTAL POLYMER MEMBRANES WITH REVERSIBLY TUNED PORE SIZE AND SELECTIVITY, AND METHODS USING SAME

(71) Applicant: THE REGENTS OF THE UNIVERSITY OF COLORADO, Denver, CO (US)

(72) Inventors: Douglas L. Gin, Longmont, CO (US); Richard D. Noble, Boulder, CO (US); Sarah Marie Dischinger, Boulder, CO (US); Blaine M. Carter, Nampa, ID (US)

(73) Assignee: The Regents of the University of Colorado, Denver, CO (US)

(*) Notice: Subject to any disclaimer, the term of this patent is extended or adjusted under 35 U.S.C. 154(b) by 225 days.

(21) Appl. No.: 15/879,902

(22) Filed: Jan. 25, 2018

(65) Prior Publication Data
US 2018/0208728 A1    Jul. 26, 2018

Related U.S. Application Data

(60) Provisional application No. 62/450,776, filed on Jan. 26, 2017.

(51) Int. Cl.
C08J 5/22 (2006.01)
C08J 9/36 (2006.01)
(Continued)

(52) U.S. Cl.
CPC ........ *C08J 5/2287* (2013.01); *B01D 67/0006* (2013.01); *B01D 67/009* (2013.01); *B01D 67/0088* (2013.01); *B01D 69/02* (2013.01);

*B01D 69/10* (2013.01); *B01D 69/125* (2013.01); *B01D 71/82* (2013.01); *B01J 41/07* (2017.01); *B01J 41/14* (2013.01); *B32B 5/18* (2013.01);
(Continued)

(58) Field of Classification Search
USPC ........................................................ 427/243
See application file for complete search history.

(56) References Cited

U.S. PATENT DOCUMENTS

| | | | |
|---|---|---|---|
| 7,090,788 B2* | 8/2006 | Elliott | .................... C09K 19/38 |
| | | | 252/299.01 |
| 7,521,003 B2* | 4/2009 | Gin | ........................ B82Y 30/00 |
| | | | 252/299.01 |

(Continued)

OTHER PUBLICATIONS

Carter, et al., Thin-film Composite Bicontinuous Cubic Lyotropic Liquid Crystal Polymer Membranes: Effects of Anion-exchange on Water Filtration Performance, J. Membrane Science, 455, 2014, pp. 143.

(Continued)

*Primary Examiner* — Brian K Talbot
(74) *Attorney, Agent, or Firm* — Saul Ewing Arnstein & Lehr LLP; Kathryn Doyle; Domingos J. Silva

(57) ABSTRACT

The invention includes methods of reversibly tuning the effective pore size and/or solute rejection selectivity of a nanoporous lyotropic liquid crystal (LLC) polymer membrane. The membranes of the invention have high levels of pore size uniformity, allowing for size discrimination separation, and may be used for separation processes such as liquid-phase separations.

6 Claims, 20 Drawing Sheets

(51) Int. Cl.
*B01J 41/07* (2017.01)
*C08F 36/22* (2006.01)
*B01J 41/14* (2006.01)
*B32B 5/18* (2006.01)
*B32B 27/28* (2006.01)
*B01D 69/12* (2006.01)
*B01D 69/10* (2006.01)
*C09K 19/02* (2006.01)
*B01D 67/00* (2006.01)
*C09K 19/38* (2006.01)
*B01D 69/02* (2006.01)
*B01D 71/82* (2006.01)
*B01D 61/02* (2006.01)

(52) U.S. Cl.
CPC .............. *B32B 27/28* (2013.01); *C08F 36/22* (2013.01); *C08J 5/2231* (2013.01); *C08J 9/36* (2013.01); *C09K 19/02* (2013.01); *C09K 19/38* (2013.01); *B01D 61/027* (2013.01); *B01D 2323/30* (2013.01); *B01D 2323/34* (2013.01); *B01D 2323/345* (2013.01); *B01D 2323/46* (2013.01); *B01D 2325/021* (2013.01); *B01D 2325/16* (2013.01); *B32B 2250/02* (2013.01); *B32B 2250/22* (2013.01); *B32B 2266/0221* (2013.01); *B32B 2305/026* (2013.01); *B32B 2305/55* (2013.01); *B32B 2355/00* (2013.01); *C08J 2347/00* (2013.01)

(56) References Cited

U.S. PATENT DOCUMENTS

| | | | | |
|---|---|---|---|---|
| 7,604,129 | B2* | 10/2009 | Gin | B01D 67/0006 205/67 |
| 7,931,824 | B2* | 4/2011 | Gin | B01D 71/06 252/299.01 |
| 2008/0029735 | A1* | 2/2008 | Gin | B01D 71/06 252/299.61 |
| 2008/0179188 | A1* | 7/2008 | Nelson | B01D 61/427 204/627 |
| 2009/0173693 | A1* | 7/2009 | Gin | B01D 67/0006 210/650 |
| 2012/0160095 | A1* | 6/2012 | Gin | B01D 53/22 95/45 |
| 2013/0190417 | A1* | 7/2013 | Mahanthappa | C07C 57/13 521/149 |
| 2013/0306907 | A1* | 11/2013 | Mahanthappa | C09K 19/02 252/299.5 |
| 2014/0154499 | A1* | 6/2014 | Gin | B01D 71/82 428/316.6 |

OTHER PUBLICATIONS

Gin, D.L. et al., "Abstracts of Papers, 252nd ACS National Meeting & Exposition," Philadelphia, PA, United States, Aug. 21-25, 2016, PMSE-508.

* cited by examiner methanesulfonate 2-propanesulfonate benzenesulfonate naphthalenesulfonate

*p*-toluenesulfonate camphorsulfonate trifluoromethanesulfonate ethanesulfonate pentanesulfonate benzene 1,3-disulfonate 1,3-propanedisulfonate

NANOPOROUS LYOTROPIC LIQUID CRYSTAL POLYMER MEMBRANES WITH REVERSIBLY TUNED PORE SIZE AND SELECTIVITY, AND METHODS USING SAME

CROSS-REFERENCE TO RELATED APPLICATION

The present application claims priority under 35 U.S.C. § 119(e) to U.S. Provisional Patent Application No. 62/450,776, filed Jan. 26, 2017, which is hereby incorporated by reference in its entirety herein.

STATEMENT REGARDING FEDERALLY SPONSORED RESEARCH OR DEVELOPMENT

This invention was made with government support under grant number 1034720 awarded by the National Science Foundation. The government has certain rights in the invention.

BACKGROUND OF THE INVENTION

The ubiquity of water usage in industrial, agricultural, and environmental applications requires the handling and processing of complex aqueous streams, ranging from recovery of valuable pharmaceutical products to purification of wastewater streams for water reuse. One example of small solute product recovery from an aqueous stream is in the production of second-generation biofuels: the hydrolysis effluent from the first processing step must be concentrated in the fermentation reagents (e.g., glucose and xylose) and cleared of solutes toxic to the fermentation process (e.g., furfural and acetic acid) before being fed to the fermentation. Another example of the need for small solute recovery is removal of trace contaminants, such as pharmaceutically active compounds and pesticides, from water. Small solute recovery from aqueous mixtures is also needed in the food industry, with growing demand for specialty foods such as low-calorie and low-fat items. While the target solute and feed conditions of these three examples vary, each requires molecular-level separation. Among the variety of separation processes available for aqueous mixtures, membranes have emerged as one of the energy-efficient solutions for aqueous separation processes.

Reverse osmosis (RO) and nanofiltration (NF) are the two major classes of membranes capable of removing molecular size solutes (i.e., small solutes on the order of ≤1 nm to several nanometers). NF is a separation process that uses pores on the nanometer length scale to recover small solutes that cannot be recovered using larger pore-based ultrafiltration (UF) processes. The presence of distinct pores through which water molecules can flow allows NF membranes to achieve higher water permeability than dense RO membranes.

While RO and NF membranes are similar in structure and composition, they vary in performance and are built for different applications. RO membranes highly reject most charged and uncharged solutes due to the presence of a dense polymeric selective layer at the surface. This high degree of rejection comes at the cost of high pressure requirements necessary to achieve water flux through the RO membrane. Alternatively, NF membranes have a porous polymeric selective layer that allows for filtration to be run at pressures lower than for RO membranes, but at the cost of reduced rejection of small charged and uncharged solutes (lower selectivity). Thus, NF membranes are built for fractionation applications in which only some solutes from a complicated mixture need to be retained, and selectivity is central to NF performance. However, challenges facing NF membranes include insufficient selectivity or separation performance. Whereas the rejection of charged solutes depend primarily on the mechanism of charge repulsion, uncharged solute rejection is more complicated. The latter involves steric interactions, hydrophobic interactions, hydrogen-bonding interactions, and other factors involved in solute-membrane affinity. While significant work has been done to understand rejection with respect to properties of the solute such as size and hydrophobicity, a better understanding of rejection with respect to properties of the membrane is still needed in order to develop membranes with better separation performance for a desired solute.

A desired rejection performance is difficult to achieve in current commercial NF membranes because the membrane characteristics that drive rejection are difficult to manipulate, and a distribution of pore sizes is inherent in these materials based on their manufacture methods. While the rejection of uncharged solutes is a complex function of various mechanisms, size sieving has been identified as one of the primary mechanisms in determining NF membrane rejection. Therefore, NF membranes are often distinguished by their size selectivity via their molecular weight cut-off (MWCO), a description of the membrane pore size. NF membrane pore size can be changed through the introduction of dopants, the manipulation of the casting solution and drying process, or the degree of cross-linking—all of which require a reformulation of the membrane fabrication process. The other option for changing the pore properties is post-fabrication modification, such as atomic layer deposition (ALD) in or molecular coating of the pores. These methods are neither facile, nor have they demonstrated control on the 1-nm scale (which is the scale of interest for performing most desired molecule-level separations). Even for membranes with an average pore size in the desired range, the distribution of pore size limits the degree of rejection achievable. Consequently, water filtration membranes with uniform pore size and facilely tuned pore characteristics are needed. An NF membrane with these features could then be designed to perform a specific molecular-level separation in water with enough selectivity to meet the application requirements.

Ionic lyotropic liquid crystal (LLC) polymer membranes with uniform-size pores on the order of 1 nm can be used to size-sieve uncharged molecules and electrostatically reject charged molecules and atomic ions. LLC phases are materials with periodic, nm-scale hydrophilic and hydrophobic regions formed by the self-assembly and phase separation of amphiphilic molecules (e.g., LLCs) in the presence of an added liquid such as water. Depending on temperature and the amount of polar solvent relative to the amount of amphiphile, a range of self-assembled structures form, from spherical micelles to columnar hexagonal (H) phases and 3D-interconnected networks of the bicontinuous cubic (Q) LLC phases. When the hydrophilic regions extend continuously across the thickness of the material, they are, in essence, a nanopore network for water and aqueous solute transport. If polymerizable LLCs (i.e., LLC monomers) are used to form these assemblies, the formed nanopore structures can be stabilized by cross-linking the monomers in situ. The periodic order throughout the material suggests a more uniform pore size distribution, as confirmed by modeling the rejection of uncharged solutes. By cross-linking the tails in the hydrophobic regions, it is possible to lock the self-assembled structure into place so that it is no longer sensitive to temperature nor composition. The polymerized material can be fabricated as a free-standing film, or it can be cast as a thin film on a porous support, forming the active layer of a thin-film composite (TFC) membrane. Both forms of the material—free standing film and active layer of a TFC membrane—are chemically and mechanically stable.

Q LLC phases have 3D-interconnected pore geometries, allowing for good water permeance because continuous hydrophilic paths are formed across the membrane without the need for phase alignment. In certain non-limiting embodiments, NF membranes can be prepared by cross-linking ionic LLC monomers that form a type I (i.e., normal) bicontinuous cubic ($Q_I$) phase in which the aqueous nanopore network has overall cubic symmetry and exists as interconnected annular slits with uniform widths. In other embodiments, $Q_I$-phase LLC polymer membranes can be based on the imidazolium-based gemini monomer 2a, which is solution-cast as the selective layer of a TFC membrane. Having a $Q_I$ phase with uniform hydrophilic slit pores with a width on the order of 1 nm, this TFC $Q_I$ polymer membrane demonstrates water filtration performance between that of commercial NF and RO membranes.

There is thus a need for novel materials and methods that can be used to prepare NF membranes. Such materials should have uniform pore size, and yet have their filtration selectivity properties easily manipulated. The present invention addresses this need.

BRIEF SUMMARY OF THE INVENTION

The invention provides a nanoporous lyotropic liquid crystal (LLC) polymer membrane. In certain embodiments, the membrane comprises a cationic LLC polymer and at least one anionic counterion. In certain embodiments, the polymer comprises at least one pore, in which at least one anionic counterion is located. In certain embodiments, the at least one anionic counterion modulates an uncharged solute selectivity of the LLC polymer membrane as compared to the LLC polymer membrane wherein a control inactive counterion is located in the at least one pore.

The invention further provides a method of preparing a nanoporous LLC polymer membrane. In certain embodiments, the membrane comprises a cationic LLC polymer and at least one anionic counterion. In certain embodiments, the LLC polymer membrane further comprises at least one pore, in which the at least one anionic counterion is located. In certain embodiments, the effective size of the at least one pore is less than about 2 nm. In certain embodiments, the method comprises contacting the membrane with a solution comprising the at least one given counterion that modulates an uncharged solute selectivity of the LLC polymer membrane as compared to the LLC polymer membrane wherein a control inactive counterion is located in the at least one pore.

The invention further provides a method of modifying the effective pore size and/or solute transport of a nanoporous LLC polymer membrane. In certain embodiments, the membrane comprises a cationic LLC polymer and at least one first anionic counterion. In certain embodiments, the LLC polymer membrane further comprises at least one pore, in which the at least one first anionic counterion is located. In certain embodiments, the effective size of the at least one pore is less than about 2 nm.

The invention further provides a method of increasing the concentration of an uncharged solute in a first solution, using a nanoporous LLC polymer membrane comprising a cationic LLC polymer and at least one anionic counterion. In certain embodiments, the polymer comprises in the at least one pore that connects in a fluidic manner a first surface of the membrane and a second surface of the membrane. In certain embodiments, the effective radius of the at least one pore is less than 2 nm. In certain embodiments, the at least one anionic counterion is located in the at least one pore. In certain embodiments, the Stokes diameter of the uncharged solute is approximately equal to the effective radius for the at least one pore of the membrane. In certain embodiments, the method comprises contacting the first solution with the first surface of the membrane. In certain embodiments, a second solution with a lower concentration of the uncharged solute than the first solution is formed on the second surface of the membrane.

In certain embodiments, the control inactive counterion is a halide. In other embodiments, the effective size of the at least one pore is less than about 2 nm. In yet other embodiments, the at least one anionic counterion is selected from the group consisting of optionally substituted linear, cyclic, or branched $C_1$-$C_6$ alkanesulfonate, optionally substituted benzenesulfonate, optionally substituted naphthalenesulfonate, optionally substituted trifluoromethanesulfonate, optionally substituted camphorsulfonate, optionally substituted alkyl- or aromatic carboxylates, and optionally substituted alkyl- or aromatic phosphonates. In yet other embodiments, the at least one counterion is optionally substituted with at least one selected from the group consisting of $C_1$-$C_6$ alkyl, $C_1$-$C_6$ haloalkyl, $C_1$-$C_6$ haloalkoxy, fluoro, chloro, bromo, iodo, cyano, nitro, —SR', —C(=O)R', —N(R')(R'), —OR', —C(=O)OR', and —C(=O)NR'R', wherein each occurrence of R' is independently H or $C_1$-$C_6$ alkyl.

In certain embodiments, the at least one pore has a structure selected from the group consisting of type I bicontinuous cubic ($Q_I$) LLC phase structure, and inverted hexagonal ($H_{II}$) LLC phase structure. In other embodiments, the LLC polymer is formed by polymerization of at least one polymerizable LLC monomer selected from the group consisting of monomers 1-6, and any combinations thereof.

In certain embodiments, the at least one anionic counterion is selected from the group consisting of methanesulfonate, trifluoromethanesulfonate, ethanesulfonate, 1-propanesulfonate, 2-propanesulfonate, 1,3-propanedisulfonate, pentanesulfonate, benzenesulfonate, benzene 1,3-disulfonate, p-toluenesulfonate, m-toluenesulfonate, o-toluenesulfonate, α-naphthalenesulfonate, β-naphthalenesulfonate and camphorsulfonate. In other embodiments, the polymer is embedded within a porous support membrane or deposited as a layer on the surface of a porous support membrane.

In certain embodiments, the LLC polymer is embedded within a porous support membrane or deposited as a layer on the surface of a porous support membrane. In other embodiments, substantially each of the pores of the cationic LLC polymer is occupied by the at least one anionic counterion. In yet other embodiments, substantially each of the pores of the cationic LLC polymer is occupied by the same anionic counterion. In yet other embodiments, the pores of the cationic LLC polymer are occupied by two or more distinct anionic counterions, which can be selected from the same or distinct chemical classes as recited herein.

In certain embodiments, the method comprises replacing the at least one first anionic counterion with at least one second anionic counterion, wherein the effective pore size and/or solute rejection of the membrane comprising the at least one first anionic counterion is distinct from that comprising the at least one second anionic counterion.

In certain embodiments, the replacing step comprises contacting the nanoporous LLC polymer membrane with a solution comprising the at least one second anionic counterion.

In certain embodiments, the at least one first anionic counterion has a distinct molecular volume ($V_{mol}$) from the at least one second anionic counterion.

In certain embodiments, the membrane comprising the at least one second anionic counterion has distinct % rejection for an uncharged solute than the membrane comprising the at least one first anionic counterion.

In certain embodiments, the Stokes diameter of the uncharged solute is approximately equal to the effective pore radius for the membrane comprising the at least one second anionic counterion.

In certain embodiments, the effective radius for the at least one pore of the membrane is about equal to or lower than the Stokes diameter of the uncharged solute.

BRIEF DESCRIPTION OF THE DRAWINGS

The following detailed description of illustrative embodiments of the invention will be better understood when read in conjunction with the appended drawings. For the purpose of illustrating the invention, certain illustrative embodiments are shown in the drawings. It should be understood, however, that the invention is not limited to the precise arrangements and instrumentalities of the embodiments shown in the drawings.

FIG. 2 illustrates non-limiting molecular structures of organosulfonate anions exchanged for bromide in the TFC $Q_I$ membranes made from monomer 2a.

FIGS. 9A-9B illustrate (FIG. 9A) PXRD and (FIG. 9B) SAXS profiles of naphthalenesulfonate-exchanged bulk $Q_I$ polymer films of 2a.

FIG. 10 illustrates PXRD spectra of a polymerized, unsupported bulk $Q_I$ film and a polymerized TFC $Q_I$ membrane of 2a.

FIG. 17 illustrates non-limiting molecular structures of organosulfonate anions exchanged for bromide in the TFC $Q_I$ membranes made from monomer 2a.

DETAILED DESCRIPTION OF THE INVENTION

Figure 1:
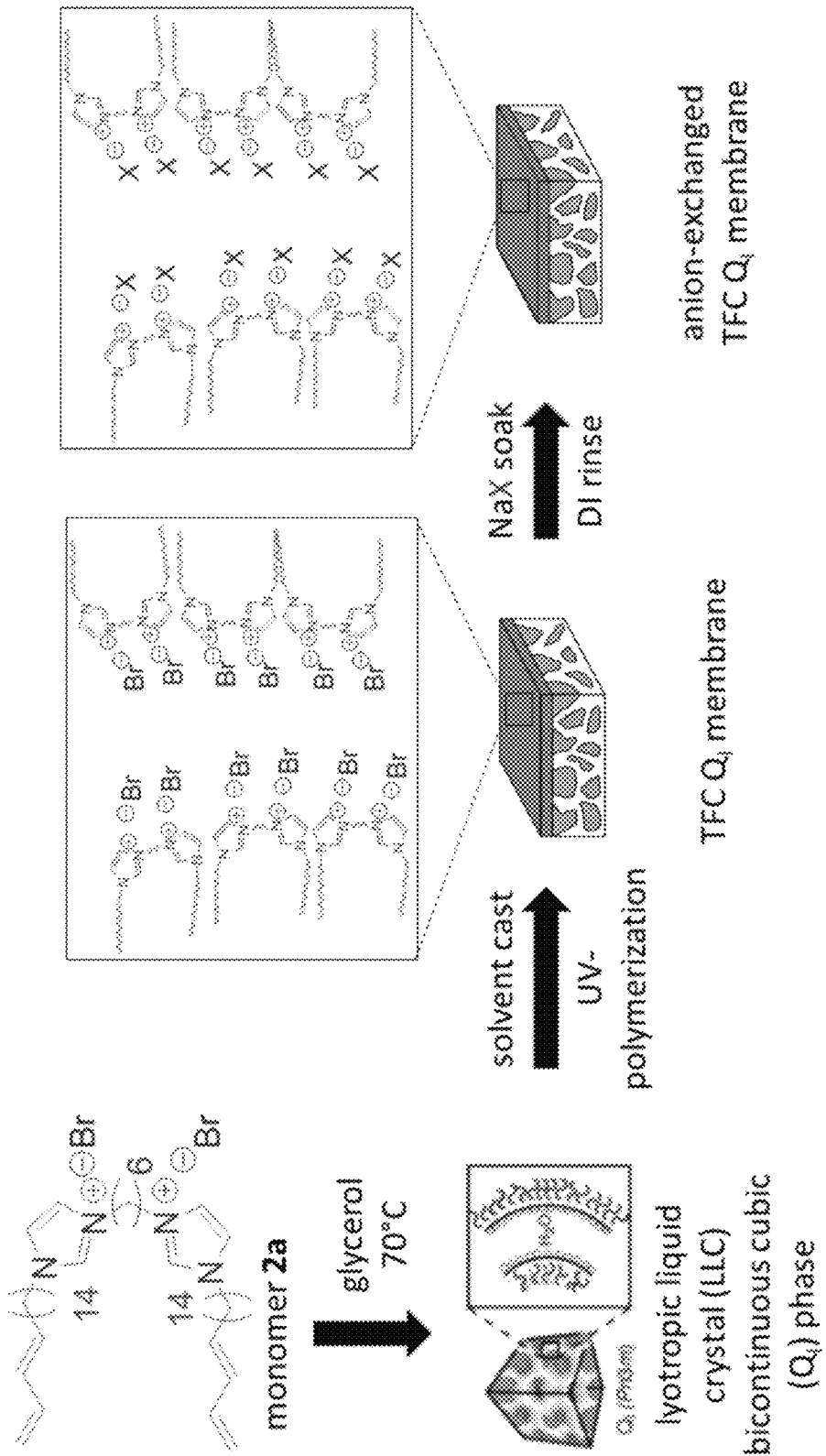
FIG. 1 comprises a scheme illustrating fabrication of a nanoporous TFC $Q_I$ polymer membrane using monomer 2a and post-fabrication anion-exchange with various anions associated at the pore wall.

The invention relates to the discovery of methods for reversibly and systematically tuning the effective pore size and/or solute rejection for nanoporous LLC polymer membranes. The invention further relates to membranes useful within the methods of the invention. The membranes of the invention have high levels of pore size uniformity, based on the good pore size uniformity of the LLC polymer membranes, thereby allowing good separation via size discrimination. In certain embodiments, the porous LLC polymer membrane has a pore structure of interconnected nanopores based on the type I (normal type) bicontinuous cubic ($Q_I$) LLC phase structure. In other embodiments, the effective pore size of the modified membrane is equal to or less than about 2.3 nm, about 2.2 nm, about 2.1 nm, about 2.0 nm, about 1.9 nm, about 1.8 nm, about 1.7 nm, about 1.6 nm, about 1.5 nm, about 1.4 nm, about 1.3 nm, about 1.2 nm, about 1.1 nm, about 1 nm, about 0.95 nm, about 0.9 nm, about 0.85 nm, about 0.8 nm, about 0.75 nm, about 0.7 nm, about 0.65 nm, about 0.6 nm, about 0.55 nm, about 0.5 nm, or about 0.45 nm. In other embodiments, the effective pore size of the structure can be determined by the size of the solute that can be excluded from the membrane.

The present results demonstrate the ability to manipulate the filtration performance of ionic, $Q_I$-phase LLC polymer NF membranes having ca. 1-2 nm-sized pores. Pore selectivity and water permeance were significantly impacted by anion-exchanging organosulfonate anions at the pore walls without significantly impacting the structural integrity of the material. The impact of the resident anion on membrane performance was described quantitatively by calculation of the effective pore radius via a one-parameter model and demonstrated sub-nm resolution in the variation of effective pore radius. Empirical modeling was used to demonstrate the existence of a correlation between the physicochemical properties of the resident anion and the observed solute rejection. Such a correlation extends the significance of this work by moving beyond the rejection performance induced by the organosulfonate anions of this study to a property-based model of possible rejection performance inducible by the organosulfonate family. The present results demonstrate that the resident anion in these ionic LLC polymers can be used to manipulate and study uncharged solute selectivity in a quantitative way, based on its physicochemical properties. Overall, this TFC $Q_I$ membrane platform offers a unique way to manipulate nanopore environments.

Definitions

As used herein, each of the following terms has the meaning associated with it in this section.

As used herein, unless defined otherwise, all technical and scientific terms generally have the same meaning as commonly understood by one of ordinary skill in the art to which this invention belongs. Generally, the nomenclature used herein and the laboratory procedures in inorganic and/or organic chemistry, polymer chemistry and materials sciences are those well-known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein, "about" when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

As used herein, the term "comprising" includes "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

As used herein, the term "electromagnetic radiation" includes radiation of one or more frequencies encompassed within the electromagnetic spectrum. Non-limiting examples of electromagnetic radiation comprise gamma radiation, X-ray radiation, UV radiation, visible radiation, infrared radiation, microwave radiation, radio waves, and electron beam (e-beam) radiation. In one aspect, electromagnetic radiation comprises ultraviolet radiation (wavelength from about 10 nm to about 400 nm), visible radiation (wavelength from about 400 nm to about 750 nm) or infrared radiation (radiation wavelength from about 750 nm to about 300,000 nm). Ultraviolet or UV light as described herein includes UVA light, which generally has wavelengths between about 320 and about 400 nm, UVB light, which generally has wavelengths between about 290 nm and about 320 nm, and UVC light, which generally has wavelengths between about 200 nm and about 290 nm. UV light may include UVA, UVB, or UVC light alone or in combination with other type of UV light. In certain embodiments, the UV light source emits light between about 350 nm and about 400 nm. In some embodiments, the UV light source emits light between about 400 nm and about 500 nm.

As used herein, the term "instructional material" includes a publication, a recording, a diagram, or any other medium of expression that may be used to communicate the usefulness of the compositions of the invention. In certain embodiments, the instructional material may be part of a kit useful for generating a system of the invention. The instructional material of the kit may, for example, be affixed to a container that contains the compositions of the invention or be shipped together with a container that contains the compositions. Alternatively, the instructional material may be shipped separately from the container with the intention that the recipient uses the instructional material and the compositions cooperatively. For example, the instructional material is for use of a kit; instructions for use of the compositions; or instructions for use of a formulation of the compositions.

As used herein, "LLC monomers" are polymerizable amphiphilic molecules that spontaneously self-assemble into fluid, yet highly ordered matrices with regular geometries of nanometer scale dimension when combined with water or another suitable polar organic solvent. LLC mesogens are amphiphilic molecules comprising one or more hydrophobic organic tails and a hydrophilic headgroup. In certain embodiments, the headgroup is ionic.

As used herein, an "LLC polymer" or "LLC polymer composition" comprises polymerized LLC monomers in an ordered assembly. The LLC polymer composition may also comprise an initiator and/or a cross-linking agent. A porous LLC polymer is formed when the ordered assembly comprises pores or channels of solvent surrounded by the LLC monomers, and the resulting assembly is covalently linked together with preservation of the LLC phase structure. In certain embodiments, the LLC polymer does not comprise functional groups such as halogen (unless as a counterion for maintaining overall charge neutrality with a cationic LLC polymer), hydroxyl, carbonyl, carboxylic acid, primary amine, or secondary amine.

As used herein, a "membrane" is a barrier separating two fluids that allows transport between the fluids. Porous LLC polymer membranes useful for the invention comprise a porous LLC polymer. In certain embodiments, the membrane to be modified is a "composite" membrane comprising a porous LLC polymer composition combined with a porous support. In certain embodiments, the porous LLC polymer membrane is a nanoporous membrane.

As used herein, a "monodisperse" pore size has a variation in pore size from one pore to another of less than ca. 15% (specifically, an ideally narrow Poisson distribution). For pore manifold systems formed by some LLC phases (e.g., Q phases), the pore size of a given pore varies along the pore channel. For pores which dimensions vary along the pore channel, a comparison of pore sizes is made at equivalent positions along the channel. In certain embodiments, the pore size is monodisperse when measured in this way. In certain embodiments, the pore size may be measured by its minimum dimension. In certain embodiments, the effective pore size of the structure may be determined by the size of the solute that can be excluded from the pore manifold.

As used herein, the term "nanoporous" refers to a pore size between about 0.5 and about 6 nm in diameter, and a "nanofiltration membrane" has an effective pore size between about 0.5 and about 6 nm. For composite nanofiltration membranes, the LLC polymer portion of the composite may be nanoporous while the porous support has a larger average pore size. In certain embodiments, the unmodified LLC polymer composition has an effective pore size between about 0.5 and 5.0 nm. In other embodiments the effective pore size greater than or equal to 0.5 to less than 2 nm, from 0.5 to 1 nm, or less than 2 nm.

As used herein, the term "polymer" refers to a molecule composed of repeating structural units typically connected by covalent chemical bonds. The term "polymer" is also meant to include the terms copolymer and oligomers.

As used herein, a "polymerizable LLC monomer" comprises a polymerizable group which allows covalent bonding of the monomer to another molecule such as another monomer, polymer or cross-linking agent. When the polymerizable group is attached to or part of the organic tail, the organic tails may be linked together during polymerization. Suitable polymerizable groups include acrylate, methacrylate, diene, vinyl, (halovinyl), styrenes, vinylether, hydroxy groups, epoxy or other oxiranes (halooxirane), dienoyls, diacetylenes, styrenes, terminal olefins, isocyanides, acrylamides, and cinamoyl groups. In certain embodiments, the polymerizable group is an acrylate, methacrylate, or diene group.

As used herein, the term "polymerization" refers to at least one reaction that consumes at least one functional group in a monomeric molecule (or monomer), oligomeric molecule (or oligomer) or polymeric molecule (or polymer), to create at least one chemical linkage between at least two distinct molecules (e.g., intermolecular bond), at least one chemical linkage within the same molecule (e.g., intramolecular bond), or any combination thereof. A polymerization reaction may consume between about 0% and about 100% of the at least one functional group available in the system. In certain embodiments, polymerization of at least one functional group results in about 100% consumption of the at least one functional group. In other embodiments, polymerization of at least one functional group results in less than about 100% consumption of the at least one functional group.

As used herein, the term "Type (I) photo-initiator" refers to a compound that undergoes a unimolecular bond cleavage upon irradiation to yield free radicals. Non-limiting examples of Type (I) photo-initiators are benzoin ethers, benzyl ketals, α-dialkoxy-acetophenones, α-hydroxy-alkylphenones, α-amino-alkylphenones and acyl-phosphine oxides.

As used herein, the term "Type (II) photo-initiator" refers to a combination of compounds that undergo a bimolecular reaction where the excited state of the photoinitiator interacts with a second molecule (often known as "co-initiator") to generate free radicals.

As used herein, the following abbreviations are applicable: ALD (atomic layer deposition); DI (deionized); EDS (energy-dispersive X-ray spectroscopy); LLC (lyotropic liquid crystal); MWCO (molecular weight cut-off); NF (nanofiltration); PLM (polarized light microscopy); PXRD (powder X-ray diffraction); RO (reverse osmosis); SAXS (small-angle X-ray scattering); TFC (thin-film composite); TOC (total organic carbon).

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Disclosure

As demonstrated herein, application of lyotropic liquid crystals (LLCs) to membrane filtration offers a solution to limitations of pore size manipulation and uniformity in NF membranes. Unlike traditional NF (and RO) membranes, the TFC $Q_I$ membrane based on monomer 2a (shown in FIG. 1) offers unique avenues to directly manipulate the nanopore characteristics. The connected network of hydrophilic regions in a TFC $Q_I$ membrane is discrete, being defined by the cationic head groups of the LLC monomers that form the pore walls. An anion associated at the cationic pore wall is held by electrostatic interactions rather than covalent bonds, allowing for this anion to be mobile and completely exchange with other anions in solution. The anion associated at the pore wall can be referred to as the resident anion. Given the size of the resident anion relative to the size of the pore, in certain embodiments the resident anion impacts transport of water and solutes through the pore. Soaking of a TFC $Q_I$ membrane based on 2a in a salt solution does afford complete anion-exchange, meaning the anion from the solution completely replaces the original anion associated at the pore wall, so long as the new anion is small enough to enter the pores. However, ion-exchange in LLC-based NF membranes for the control of uncharged solute rejection has not been previously demonstrated.

The present work investigates the impact of anion-exchange on the uncharged solute rejection and water permeance of the TFC $Q_I$ membrane based on 2a using certain anions of varying size. The impact of anion-exchange was qualitatively evaluated by observing changes in uncharged solute rejection. In one aspect, solute rejection is a result of pore selectivity. The impact of anion-exchange on pore selectivity was quantified via the calculation of the effective pore radius using a one-parameter model. An empirical model was used to investigate the relationship between the various physicochemical properties of the resident anion (i.e., molecular volume and hydrophobicity) and the uncharged solute rejection of the resulting membrane. The empirical model was used to correlate the control factor (i.e., resident anion property) and the response (i.e., solute rejection) in order to demonstrate the potential range of pore manipulation via anion-exchange. As demonstrated herein, solute rejection can be manipulated with a high degree of resolution in the nm-sized pores present in the $Q_I$ material.

In certain embodiments, different porous architectures can be achieved via the use of LLC monomers that form different mesophases in a solvent. Depending on where they appear on the phase diagram relative to the central lamellar (Lα) phase, these phases can be classified as Type I (oil-in-water or normal) or Type II (water-in-oil or inverted). In certain embodiments, the pores of the mesophase are filled with the solvent, the solvent being a polar liquid such as water or an aqueous solution. In such embodiments, the hydrophilic headgroups of the LLC mesogens are oriented towards the pores of the mesophase, "lining" the pores. The LLC phase structure may be a polydomain structure, and thus may display short-range rather than long-range order.

A small number of non-aqueous solvent-based LLC systems are known in the literature. These water-free LLC phases are formed around organic solvents such as ethylene glycol, glycerol, formamide, N-methylformamide, dimethylformamide, N-methylsydnone, (Auvray, et al., 1992, Langmuir 8:2671), and some imidazolium-based room-temperature ionic liquids (RTILs) (Greaves & Drummond, 2008, J. Chem. Soc. Rev. 37:1709), instead of water.

LLC monomers useful for the present invention may be polymerized into a crosslinked network with substantial retention of the original LLC phase microstructure. In some LLC phases, contraction of the structure is observed on heavy crosslinking of the polymer into a network. Expansion of $Q_I$ unit cells has been observed for some LLC monomers (Pindzola, et al., 2003, J. Am. Chem. Soc. 125(10): 2940-2949). Some disordering of the phases may also be observed upon cross-linking, as evidenced by a loss in X-ray diffraction (XRD) peak intensity.

In certain embodiments, the pore structure after polymerization is substantially determined or controlled by the Q phase that is formed by the monomers. In this case, the pore structure can be based on the Q LLC structure. The pore structure after polymerization need not be identical to that of the Q LLC phase. In certain embodiments, the pore structure of the polymerized network retains at least part of the Q phase structure and comprises interconnected, ordered 3-D nanopores. Retention of the Q phase structure can be confirmed through observation of PXRD peaks characteristic of the structure.

In certain embodiments, the LLC polymer has a pore structure of interconnected nanopores. For example, polymerizable LLC phases with Q LLC architectures have interconnected 3-D nanochannels. These phases are termed bicontinuous because they have two or more unconnected but interpenetrating hydrophobic and/or solvent networks with overall cubic symmetry. In such cases, the polymerized network has a pore structure of interconnected, ordered 3-D nanopores. The pore structure is substantially determined or controlled by the Q phase formed by the monomers. In certain embodiments, the LLC polymer composition has a pore structure of interconnected nanopores based on the type I (normal type) bicontinuous cubic ($Q_I$) LLC phase structure. For $Q_I$ phases, the size of the gap between the organic portions of the structure determines the effective pore size of the structure.

Several polymerizable LLCs are known to spontaneously form $Q_I$ LC phases. These mesogens include gemini surfactant monomers. Monomer 1 forms a $Q_I$ phase (Pindzola, Ph.D. Thesis (2001), University of California, Berkeley). In certain embodiments, the spacer and tail length of the gemini surfactant are "matched", with larger spacer lengths corresponding to longer tail lengths. In other embodiments, x is 8, 10 or 14 and y is 2, 4 or 6; y=2 and x=10; y=6 and x=10, y=8 and x=10, y=8 and x=14.

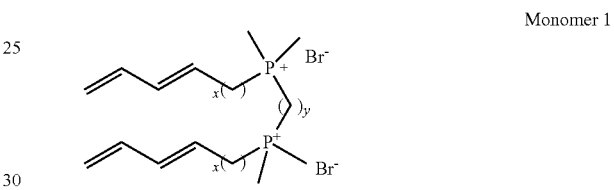

Monomer 1

Polymerizable gemini cationic imidazolium surfactants based on room temperature ionic liquids (RTILs) have also been developed and are described in U.S. Patent Application Publication No. US 2008/0029735, which is hereby incorporated by reference. These surfactants can form $Q_I$ phases when mixed with water, polar organic solvents, or room-temperature ionic liquids.

In certain embodiments, the polymerizable gemini imidazolium surfactant composition is monomer 2:

[(P—Y)—H-L-H—(Y—P)]$^{2+}$.(2/n)[X$^n$]    Monomer 2, wherein:

H is a hydrophilic head group comprising a five membered cationic aromatic ring containing two nitrogens (e.g., an imidazolium ring);

X is an anion of negative charge n,

L is a spacer or linking group which connects the two headgroup rings, and

Y is a hydrophobic tail group attached to each ring and having at least 10 carbon atoms and comprising a polymerizable group P.

Each spacer L is attached to a first nitrogen atom in each of the two linked rings. The attachment can be through a covalent or a noncovalent bond, such as an ionic linkage. Each hydrophobic tail group Y is attached to the second (other, non-bridged) nitrogen atom in each ring. The combination of the hydrophilic head group H, the linker L, and the hydrophobic tail Y form an imidazolium cation.

Monomer 2 is an imidazolium-based polymerizable gemini surfactant that forms Q LLC phases with RTILs and water as the polar solvent. In certain embodiments, m in the tail ranges from 0 to 10; and headgroup linker L is $(CH_2)_x$ with x ranging from 1 to 12 or L=$((CH_2)_2O)_y(CH_2)_2$, with y ranging from 1 to 6. In other embodiments, m is 0 to 6 or 3-7.

In certain embodiments, the anion present in the surfactant or monomer, X, is a standard anion used in preparing RTILs. These anions include, but are not limited to BR$^-$, $BF_4^-$, $Cl^-$, $I^-$, $CF_3SO_3^-$, $Tf_2N^-$ (and other large fluorinated anions), $PF_6^-$, $DCA^-$, $MeSO_3^-$, and $TsO^-$. In certain embodiments, the anion $X^-$ is selected from the group consisting of $Br^-$ and $BF_4^-$.

Suitable polymerizable groups include acrylate, methacrylate, diene, vinyl, (halovinyl), styrenes, vinylether, hydroxy groups, epoxy or other oxiranes (halooxirane), dienoyls, diacetylenes, styrenes, terminal olefins, isocyanides, acrylamides, and cinnamoyl groups. In certain embodiments, the polymerizable group is an acrylate, methacrylate or diene group. In other embodiments, the polymerizable group is an acrylate group. The tail group may have some portions that are more hydrophobic than others (e.g., if the tail contains a polymerizable group attached to an alkyl chain), but the tail group is overall hydrophobic with respect to the headgroup portion of the molecule.

In certain embodiments, surfactants that form the Q phase have $L=(CH_2)_x$, $x=6$, and $X^-=BF_4^-$. In other embodiments, surfactants that form the Q LLC phase have $L=((CH_2)_2O)_y(CH_2)_2$ and $y=1$ or $2$, $X^-$=halide ion (e.g., $Br^-$ and $m=3-7$). In yet other embodiments, $L=((CH_2)_2O)_y(CH_2)_2$ with $y=1$, $X^-=Br^-$, $m=5$, and P=1,3-diene (monomer platform 2).

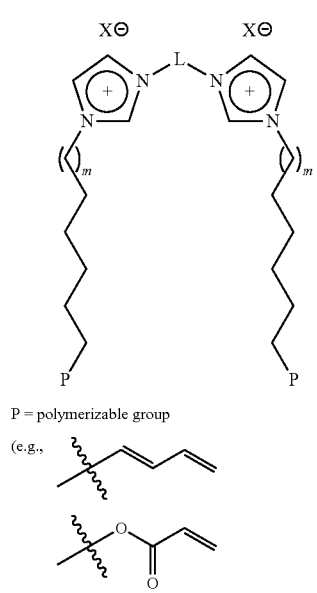

Monomer 2

Certain polymerizable LLCs (i.e., cross-linkable surfactants) can also spontaneously form the inverted hexagonal ($H_{II}$) LLC phase in the presence of a small amount of water. Upon photopolymerization or photo-cross-linking, robust polymer networks containing hexagonally packed, extended water channels with monodisperse diameters of nanometer-scale dimensions are produced. The network has a pore structure of hexagonally ordered, cylindrical nanopores. The pore structure is substantially determined or controlled by the inverted hexagonal phase formed by the monomers. In certain embodiments, the LLC polymer composition has a pore structure of nanopores based on the type II (inverted) hexagonal ($H_{II}$) structure. Polymerizable LLCs may also form lamellar phases. $H_{II}$-phase forming monomers are typically taper-shaped molecules, and some examples (monomers 3-6) are shown below.

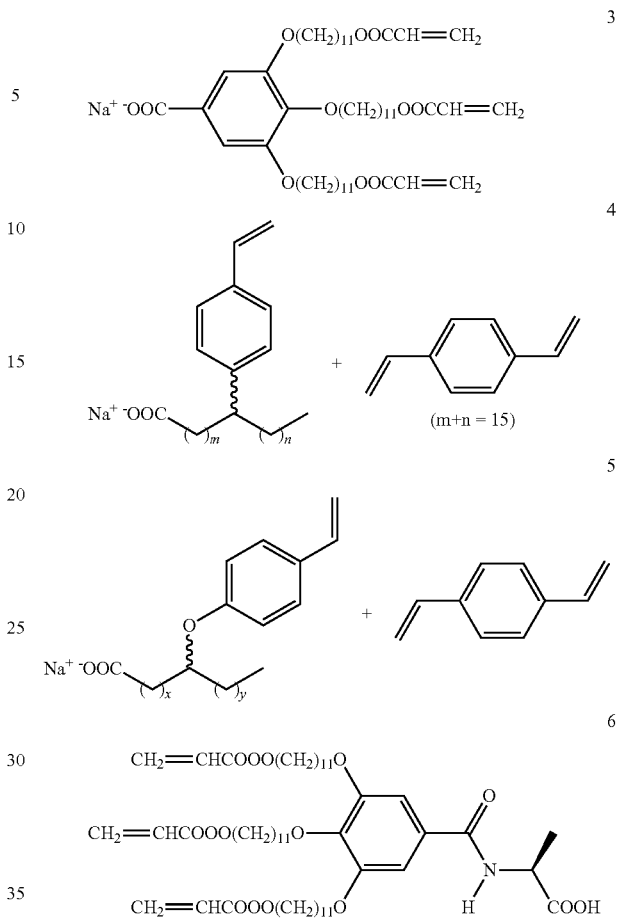

In certain embodiments, the pores of the as-synthesized LLC polymer composition may be filled with water, an aqueous solution, or some other polar liquid. In certain embodiments, the pores of the LLC polymer composition may be filled with the polar liquid by using this liquid as the solvent in the LLC mixture.

In certain embodiments, the porous LLC polymer composition is embedded within a porous support membrane, thereby forming a composite membrane. In the portions of the support containing the LLC polymer composition, the LLC polymer composition fills enough of the support pore space, so that separation process is controlled by the pores of the LLC polymer composition. In certain embodiments, there is no detectable and/or significant "non-LLC" pore (non-LLC-derived void space) with a pore size greater than that of the LLC polymer composition that traverses the composite membrane. In certain embodiments, there is no detectable and/or significant "non-LLC" pore (non-LLC-derived void space) that traverses the composite membrane. In certain embodiments, the LLC polymer composition is present throughout the thickness of the support, so that the thickness of the composite membrane may be taken as the thickness of the support. During fabrication of the composite membrane, the LLC mixture may be applied to only a portion of the surface of the support. The LLC polymer composition may be retained within the support by mechanical interlocking of the LLC polymer composition with the support.

In certain embodiments, the membrane to be modified comprises a porous support, and a porous LLC polymer composition attached to the support. The LLC polymer composition has a pore structure of interconnected nanopores based on the type I (normal type) $Q_I$ LLC phase structure. In certain embodiments, the LLC polymer composition comprises a polymer network formed from polymerizable LLC monomers and optional cross-linking agents. In certain embodiments, the LLC polymer composition is formed by polymerization of an LLC mixture which forms the type I (normal type) $Q_I$ LLC phase, the LLC mixture comprising polymerizable LLC monomers and a solvent and not including a hydrophobic polymer, the LLC polymer composition comprising a pore structure of interconnected nanopores based on the type I bicontinuous cubic LLC structure. The polymerizable LLC monomers are assembled in the type I (normal type) $Q_I$ prior to polymerization.

In certain embodiments, the LLC polymer composition forms a layer on the surface of the support; this layer acts as a membrane. In other embodiments, the thickness of this layer is less than 10 microns, less than 5 microns, less than 2 microns, less than 1 micron, or less than 0.5 microns.

In certain embodiments, the porous support is hydrophilic. As used herein, a hydrophilic support is wettable by water and capable of spontaneously absorbing water. The hydrophilic nature of the support may be measured by various methods known to those skilled in the art, including measurement of the contact angle of a drop of water placed on the membrane surface, the water absorbency (weight of water absorbed relative to the total weight, U.S. Pat. No. 4,720,343) and the wicking speed (U.S. Pat. No. 7,125,493). The observed macroscopic contact angle of a drop of water placed on the membrane surface may change with time. In certain embodiments, the contact angle of a 2 µL drop of water placed on the support surface (measured within 30 seconds) is less than about 90 degrees, from about 5 degrees to about 85 degrees, about zero degrees to about 30 degrees or is about 70 degrees. In other embodiments, the membrane is fully wetted by water and soaks all the way through the membrane after about one minute. Hydrophilic polymeric supports include supports formed of hydrophilic polymers and supports which have been modified to make them hydrophilic. In other embodiments, the support is hydrophobic.

Typically, the porous support membrane has a smaller flow resistance than the LLC membrane. In certain embodiments, the porous support in this system is selected so that the diameter of the pores is less than about 10 microns and greater than the effective pore size of the LLC polymer composition. In certain embodiments, the support is microporous or ultraporous. In other embodiments, the support has a pore size less than about 0.1 micron or from 0.1 micron to 10 microns. The preferred pore size of the support may depend on the composition of the LLC mixture. The characteristic pore size of the membrane may depend on the method used to measure the pore size. Methods used in the art to determine the pore size of membranes include Scanning Electron Microscopy analysis, capillary flow porometry analysis (which gives a mean flow pore size), measurement of the bubble pressure (which gives the largest flow pore size), and porosimetry.

The porous support membrane can give physical strength to the composite structure. When the LLC polymer composition is somewhat brittle, the support membrane can also add flexibility to the composite membrane. The support should also be thermally stable over approximately the same temperature range as the LLC membranes to be used.

The support is selected to be compatible with the solution used for LLC membrane formation, as well as to be compatible with the liquid or gas to be filtered. When the solution used for LLC membrane fabrication and the support are compatible, the support is resistant to swelling and degradation by the solution used to cast the LLC polymer porous membrane. In certain embodiments, the organic solvent used in the solution and the support are selected to be compatible so that the support is substantially resistant to swelling and degradation by the organic solvent. Swelling and/or degradation of the support by the solvent may lead to changes in the pore structure of the support. In certain embodiments, if the membrane is to be used for water based separations, the porous support is sufficiently hydrophilic for water permeation.

The porous support may be made of any suitable material known to those skilled in the art including polymers, metals, and ceramics. In various embodiments, the porous polymer support comprises polyethylene (including high molecular weight and ultra high molecular weight polyethylene), polyacrylonitrile (PAN), polyacrylonitrile-co-polyacrylate, polyacrylonitrile-co-methylacrylate, polysulfone (PSf), Nylon 6,6, poly(vinylidene difluoride), or polycarbonate. In certain embodiments, the support is a polyethylene support or a support of another polymer mentioned elsewhere herein (including surface treatments to affect the wettability of the support). The support may also be an inorganic support such as a nanoporous alumina disc (Anopore, J. Whatman, Ann Arbor, Mich.). The porous support can also be a composite membrane.

In certain embodiments, the solution used for applying the LLC monomer, also known as the "LLC mixture", comprises a plurality of polymerizable LLC monomers, an aqueous or polar organic solvent, and a polymerization initiator. A single species of polymerizable LLC monomer may be used, but a plurality of monomers is required for phase formation. The aqueous or polar solvent is selected so that the LLC monomer forms the desired $Q_I$ phase. Because of the LLC phase formation, the solution formed may not be uniform. The mixture components do not include the porous support. In certain embodiments, suitable polar liquid solvents include, but are not limited to water, dimethylformamide, and THF or room temperature ionic liquids. In other embodiments, suitable polar organic solvents suitable as water substitutes for LLC assembly include ethylene glycol, glycerol, formamide, N-methylformamide, dimethylformamide, or N-methylsydnone, most of which are fairly water-miscible, protic organic solvents, with the exception of N-methylsydnone. RTILs are polar, molten organic salts under ambient conditions that are typically based on substituted imidazolium, phosphonium, ammonium, and related organic cations complemented by a relatively non-basic and non-nucleophilic large anion. In certain embodiments, the solvent is aqueous. The polymerization initiator can be photolytically or thermally activated. The mixture is thoroughly combined. In certain embodiments, mixing may be performed through a combination of hand mixing and centrifuging.

In certain embodiments, the LLC mixture does not further comprise a hydrophobic polymer as described by Lu et al., 2006, Adv. Mater. 18(24): 3294-3298 and U.S. Pat. No. 7,090,788.

The LLC mixture may further comprise an optional cross-linking agent molecule to help promote intermolecular bonding between polymer chains. The crosslinking agent is not required if the monomer can cross-link without a cross-linking agent. In certain embodiments, the cross-linking agent is not a polymer. In certain embodiments, the cross-linking agent has less than 10 monomeric repeat units and/or has a weight less than 500 daltons. Typically, the cross-linking agent or curing agent is a small molecule or monomeric cross linker such as divinylbenzene (DVB), and are known to those skilled in the art.

The amount of cross-linking agent is small enough to allow formation of the desired LLC phase. The cross-linker is typically hydrophobic, in order to dissolve in and help to cross-link the hydrophobic tail regions of the LLC phase. For water filtration applications, the incorporation of additional hydrophobic components into the LLC mixture may be limited to prevent the overall polymeric composition from being too hydrophobic for good water filtration. In certain embodiments, the maximum amount of cross-linking agent is 10 wt % to 15 wt %. In other embodiments, when the cross-linking agent is hydrophobic, its size is kept small enough so that reduction of the overall density or surface coverage of the polar solvent (e.g., water) nanopores is limited.

The photo-initiator contemplated within the invention is a molecule that, upon irradiation with a given wavelength at a given intensity for a given period of time, generates at least one species capable of catalyzing, triggering or inducing a polymerization or crosslinking. A photo-initiator known in the art may be employed, such as a benzoin ether and a phenone derivative such as benzophenone or diethoxyacetophenone. In certain embodiments, the irradiation comprises ultraviolet electromagnetic radiation (wavelength about 10-400 nm), visible electromagnetic radiation (wavelength about 400-750 nm) or infrared electromagnetic radiation (radiation wavelength about 750-300,000 nm). In other embodiments, the electromagnetic radiation comprises ultraviolet or visible electromagnetic radiation.

Ultraviolet or UV light as described herein includes UVA light, which generally has wavelengths between about 320 and about 400 nm, UVB light, which generally has wavelengths between about 290 nm and about 320 nm, and UVC light, which generally has wavelengths between about 200 nm and about 290 nm. UV light may include UVA, UVB, or UVC light alone or in combination with other type of UV light. In certain embodiments, the UV light source emits light between about 350 nm and about 400 nm. In some embodiments, the UV light source emits light between about 400 nm and about 500 nm.

Non-limiting examples of the photoinitiator contemplated within the invention are: 1-hydroxy-cyclohexyl-phenyl-ketone (IRGACURE® 184; Ciba, Hawthorne, N.J.); a 1:1 mixture of 1-hydroxy-cyclohexyl-phenyl-ketone and benzophenone (IRGACURE® 500; Ciba, Hawthorne, N.J.); 2-hydroxy-2-methyl-1-phenyl-1-propanone (DAROCUR® 1173; Ciba, Hawthorne, N.J.); 2-hydroxy-1-[4-(2-hydroxyethoxy)phenyl]-2-methyl-1-propanone (IRGACURE® 2959; Ciba, Hawthorne, N.J.); methyl benzoylformate (DAROCUR® MBF; Ciba, Hawthorne, N.J.); oxy-phenyl-acetic acid 2-[2-oxo-2-phenyl-acetoxy-ethoxy]-ethyl ester; oxy-phenyl-acetic 2-[2-hydroxy-ethoxy]-ethyl ester; a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester (IRGACURE® 754; Ciba, Hawthorne, N.J.); alpha,alpha-dimethoxy-alpha-phenylacetophenone (IRGACURE® 651; Ciba, Hawthorne, N.J.); 2-benzyl-2-(dimethylamino)-1-[4-(4-morpholinyl)-phenyl]-1-butanone (IRGACURE® 369; Ciba, Hawthorne, N.J.); 2-methyl-1-[4-(methylthio)phenyl]-2-(4-morpholinyl)-1-propanone (IRGACURE® 907; Ciba, Hawthorne, N.J.); a 3:7 mixture of 2-benzyl-2-(dimethylamino)-1-[4-(4-morpholinyl) phenyl]-1-butanone and alpha,alpha-dimethoxy-alpha-phenylacetophenone per weight (IRGACURE® 1300; Ciba, Hawthorne, N.J.); diphenyl-(2,4,6-trimethylbenzoyl) phosphine oxide (DAROCUR® TPO; Ciba, Hawthorne, N.J.); a 1:1 mixture of diphenyl-(2,4,6-trimethylbenzoyl)-phosphine oxide and 2-hydroxy-2-methyl-1-phenyl-1-propanone (DAROCUR® 4265; Ciba, Hawthorne, N.J.); phenyl bis(2,4,6-trimethyl benzoyl) phosphine oxide, which may be used in pure form (IRGACURE® 819; Ciba, Hawthorne, N.J.) or dispersed in water (45% active, IRGACURE® 819DW; Ciba, Hawthorne, N.J.); a 2:8 mixture of phosphine oxide, phenyl bis(2,4,6-trimethyl benzoyl) and 2-hydroxy-2-methyl-1-phenyl-1-propanone (IRGACURe® 2022; Ciba, Hawthorne, N.J.); IRGACURE® 2100, which comprises phenyl-bis(2,4,6-trimethylbenzoyl)-phosphine oxide); bis-(eta 5-2,4-cyclopentadien-1-yl)-bis-[2,6-difluoro-3-(1H-pyrrol-1-yl) phenyl]-titanium (IRGACURE® 784; Ciba, Hawthorne, N.J.); (4-methylphenyl) [4-(2-methylpropyl) phenyl]-iodonium hexafluorophosphate (IRGACURE® 250; Ciba, Hawthorne, N.J.); 2-(4-methylbenzyl)-2-(dimethylamino)-1-(4-morpholinophenyl)-butan-1-one (IRGACURE® 379; Ciba, Hawthorne, N.J.); 4-(2-hydroxyethoxy) phenyl-(2-hydroxy-2-propyl)ketone (IRGACURE® 2959; Ciba, Hawthorne, N.J.); bis-(2,6-dimethoxybenzoyl)-2,4,4-trimethylpentylphosphine oxide; a mixture of bis-(2,6-dimethoxybenzoyl)-2,4,4-trimethylpentylphosphine oxide and 2-hydroxy-2-methyl-1-phenyl-propanone (IRGACURE® 1700; Ciba, Hawthorne, N.J.); titanium dioxide; and mixtures thereof.

The photo-initator can be used in amounts ranging from about 0.01 to about 25 weight percent (wt %) of the composition, more preferably from about 0.1 to about 20 weight percent (wt %) of the composition, more preferably from about 1 to about 15 weight percent (wt %) of the composition, more preferably from about 2 to about 10 weight percent (wt %) of the composition.

The mixture may further comprise an organic solvent for formulation or delivery of the LLC monomer (e.g., for solvent casting). The solvent may be any low boiling point organic solvent that dissolves the monomer. A mixture of one or more solvents may also be used. Useful solvents include, but are not limited to, methanol and diethyl ether. In certain embodiments, the monomer is dissolved in the organic solvent, and then the water and the optional cross-linking agent are added. In certain embodiments, the organic solvent used in the solution and the support are selected to be compatible so that the support is substantially resistant to swelling and degradation by the organic solvent. Swelling and/or degradation of the support by the solvent can lead to changes in the pore structure of the support.

The composition of the LLC mixture may be selected to obtain the desired Q based on the phase diagram for the LLC monomer. For example, at atmospheric pressure the LLC phases present in the system may be determined as a function of temperature and percentage of amphiphile (LLC monomer) in the system. The percentage of LLC monomer in the mixture and the temperature may then be selected together to obtain the desired Q phase. When the phase of LLC mixture is sensitive to the water or other solvent content, steps may be taken to minimize evaporative water or solvent loss during the membrane fabrication process.

In certain embodiments, the weight percent of water in the LLC mixture is from 5% to 15 wt %. Temperature control may be needed to maintain the phase during the photo-cross-linking after infiltration into the support membrane (i.e., ca. 70° C.). In other embodiments, the concentration of the imidazolium-based LLC surfactant or monomer is between 10% and 100%.

In certain embodiments, the LLC mixture is assembled into the LLC phase before the mixture is contacted with the porous support. The mixture may be allowed to rest at room temperature or at any suitable temperature dictated by the phase diagram. Analysis of the LLC phases can be performed by several methods known to those skilled in the art including polarized light microscopy (PLM) and powder X-ray diffraction (PXRD). Q phases are optically isotropic (have a black optical texture) when viewed with the PLM. PXRD of Q phases exhibit symmetry-allowed d spacings that ideally proceed in the ratio 1:1/sqrt(2): 1/sqrt(3): 1/sqrt(4): 1/sqrt(5): 1/sqrt(6): 1/sqrt(8): 1/sqrt(9): 1/sqrt(10): and so forth, corresponding to the $d_{100}$, $d_{110}$, $d_{111}$, $d_{200}$, $d_{210}$, $d_{211}$, $d_{220}$, $d_{221}$ (or $d_{300}$), $d_{310}$, and so forth diffraction planes. The presence of Q phases with P or I symmetry in polydomain small molecule amphiphile and phase separated block copolymer systems has generally been identified on the basis of a black optical texture and a PXRD profile in which the 1/sqrt(6): and 1/sqrt(8): d spacings (i.e., the $d_{211}$ and $d_{220}$ reflections) are at least present. The higher order PXRD reflections may be used to distinguish between the different 3-D cubic phase architectures, since systematic absences in the PXRD peaks result as the cubic cells becomes more complex. However, the higher order reflections may not be observed when the phases do not possess a great deal of long range order. In certain embodiments, the LLC mixture has a fluid gel-like consistency before cross-linking or polymerization.

In certain embodiments where the LLC polymeric composition is embedded into the support, a quantity of the LLC mixture is placed on a surface of the porous support membrane and then infused into the porous support. In certain embodiments, the support is impregnated with the LLC mixture using a combination of heat and pressure to drive the LLC mixture into the pores of the support. The temperature and pressure are selected so that LLC phase is still retained. The LLC mixture and support can be heated to decrease the viscosity of the LLC mixture before pressure is applied. In certain embodiments, a heated press may be used to impregnate the support with the LLC mixture. When a press is used, the LLC mixture and support membrane may be sandwiched between a pair of load transfer plates. Additionally, a pair of polymeric sheets may be used to facilitate release of the support mixture and membrane from the load transfer plates and limit evaporation of water from the mixture. Suitable dense polymeric sheets that are transparent to UV or visible light include, but are not limited to, MYLAR® (a biaxially-oriented polyester film made from ethylene glycol and dimethyl teraphthalate). The LLC mixture need not completely fill the pore space of the support, but fills enough of the pore space of the support so that separation process is controlled by the pores of the LLC polymer composition. In certain embodiments, the gel is pushed uniformly through the entire support membrane thickness.

After impregnation of the support with the LLC mixture, the LLC monomers are then cross-linked to form the LLC polymer composition. In certain embodiments, the LLC monomers are polymerized by cross-linking the hydrophobic tails. In certain embodiments, the LLC phase can be photo-cross-linked by putting it under UV light in air or nitrogen at ambient temperature (or at the required temperature to maintain the desired LLC phase). Other temperatures as known by those skilled in the art may be used during the cross-linking process. Other methods of crosslinking as known to those skilled in the art may also be used. For example, thermal cross-linking can be performed using a cationic initiator as a cross-linking agent. The degree of cross-linking can be assessed with infrared (IR) spectroscopy. In different embodiment, the degree of polymerization is greater than 90% or greater than 95%. In other embodiments, the LLC polymer composition is formed as a thin, supported top-film on top of the support. In certain embodiments, the coating of the LLC monomer mixture is formed by solution-casting the LLC monomer mixture to make thin films on membrane supports after evaporation of the delivery solvent; doctor-blade draw-casting of the initial viscous LLC monomer gel; or roll-casting of the LLC mixture at elevated temperature. Coating can be free of surface defects such as pinholes and scratches. In certain embodiments, a commercial foam painting sponge or other such applicator may be used to apply the solution to the support. In other embodiments, the solution may be applied by roller casting. The amount of material on the support may be controlled by the number of applications and the concentration of the casting solution. If desired, more than one layer of solution may be applied to the support to form multiple layers of porous LLC polymer and thereby control the film thickness.

Some of the solution typically penetrates into the support, with the extent of penetration depending on the nature of the solution, the support, and the application process. The penetration of the solution into the support is believed to help attach the cross-linked LLC polymer film to the support. When the LLC phase is sensitive to the solvent content of the LLC mixture, the solvent content (e.g., water content) is controlled during processing to maintain the desired LLC phase. In certain embodiments, the solvent content is controlled by limiting evaporation of solvent from the film. Evaporation of the solvent can be controlled by sandwiching the LLC film and support between polymer sheets, processing the LLC film and support in an enclosure in which the atmosphere is controlled (e.g., the humidity level is controlled), and by other methods known to those skilled in the art. Enclosing the LLC film may also prevent other components from entering into LLC monomer film.

Compositions

The invention provides a nanoporous lyotropic liquid crystal (LLC) polymer membrane. In certain embodiments, the membrane comprises a cationic LLC polymer and at least one anionic counterion.

In certain embodiments, the polymer comprises at least one pore, in which at least one anionic counterion is located. In other embodiments, the at least one anionic counterion modulates (e.g., decreases or increases) an uncharged solute selectivity of the LLC polymer membrane as compared to the LLC polymer membrane wherein a control inactive counterion is located in the at least one pore. In yet other embodiments, the control inactive counterion is a halide, such as but not limited to fluoride, chloride, bromide, and/or iodide.

In certain embodiments, the at least one anionic counterion is selected from the group consisting of optionally substituted linear, cyclic, or branched $C_1$-$C_6$ alkanesulfonate, optionally substituted benzenesulfonate, optionally substituted naphthalenesulfonate, optionally substituted trifluoromethanesulfonate, and optionally substituted camphorsulfonate. In certain embodiments, the at least one anionic counterion is selected from the group consisting of optionally substituted alkyl- or aromatic-based carboxylates, including but not limited to propionate and benzoate, as well as optionally substituted alkyl- or aromatic-based phosphonates, including but not limited to methylphosphonate and phenylphosphonate. In addition to anionic counter ions containing linear, branched, and cyclic hydrocarbons, an anionic counterion is optionally substituted with at least one substituent selected from the group consisting of ether, ester, alcohol, ketone, amine, amide, thiol, sulfide, aldehyde, and halide. In yet other embodiments, the anionic counterion is optionally substituted with at least one selected from the group consisting of $C_1$-$C_6$ alkyl, $C_1$-$C_6$ haloalkyl, $C_1$-$C_6$ haloalkoxy, fluoro, chloro, bromo, iodo, cyano, nitro, —SR', —C(=O)R', —N(R')(R'), —OR', —C(=O)OR', and —C(=O)NR'R', wherein each occurrence of R' is independently H or $C_1$-$C_6$ alkyl.

In certain embodiments, there is more than one type of counterion associated with the membrane cationic pore wall. In certain embodiments, the counterion is monovalent or multivalent. In other embodiments, the counterion is a poly(anionic) molecule that contains multiple, covalently bonded anionic functional groups such as sulfonate or carboxylate groups. Non-limiting examples of such molecular poly(anions) are aryl- or alkyldisulfonates (e.g., benzene 1,3-disulfonate and 1,3-propanedisulfonate) and aryl- and alkyldicarboxylates (e.g., benzene 1,3-dicarboxylate and 1,3-propanedicarboxylate).

In certain embodiments, the effective size of the at least one pore is equal to or less than about 2 nm, or about 1.5 nm, or about 1.0 nm.

In certain embodiments, the at least one pore has a structure selected from the group consisting of type I bicontinuous cubic ($Q_I$) LLC phase structure, and inverted hexagonal ($H_{II}$) LLC phase structure.

In certain embodiments, the LLC polymer is formed by polymerization of at least one polymerizable LLC monomer selected from the group consisting of monomers 1-6, and any combinations thereof.

In certain embodiments, the LLC polymer is formed by polymerization of at least one polymerizable LLC monomer 2a.

In certain embodiments, the at least one anionic counterion is selected from the group consisting of methanesulfonate, ethanesulfonate, 1-propanesulfonate, 2-propanesulfonate, benzenesulfonate, p-toluenesulfonate, m-toluenesulfonate, o-toluenesulfonate, α-naphthalenesulfonate, β-naphthalenesulfonate and camphorsulfonate.

In certain embodiments, the polymer is embedded within a porous support membrane or deposited as a layer on the surface of a porous support membrane.

Methods

The invention provides a method of preparing a nanoporous LLC polymer membrane, wherein the membrane comprises a cationic LLC polymer and at least one anionic counterion, wherein the LLC polymer membrane further comprises at least one pore, in which the at least one anionic counterion is located, and wherein the effective size of the at least one pore is equal to or less than about 2 nm, or about 1.5 nm, or about 1.0 nm.

The invention further provides a method of modifying the effective pore size and/or solute rejection of a nanoporous LLC polymer membrane, wherein the membrane comprises a cationic LLC polymer and at least one first anionic counterion, wherein the LLC polymer membrane further comprises at least one pore, in which the at least one first anionic counterion is located, and wherein the effective size of the at least one pore is equal to or less than about 2 nm, or about 1.5 nm, or about 1.0 nm.

The method further provides a method of increasing the concentration of an uncharged solute in a first solution, using a nanoporous LLC polymer membrane comprising a cationic LLC polymer and at least one anionic counterion, wherein the polymer comprises in the at least one pore that connects in a fluidic manner a first surface of the membrane and a second surface of the membrane, wherein the effective radius of the at least one pore is equal to or less than about 2 nm, or about 1.5 nm, or about 1.0 nm, wherein the at least one anionic counterion is located in the at least one pore, and wherein the Stokes diameter of the uncharged solute is approximately equal to the effective radius for the at least one pore of the membrane, In certain embodiments, the method comprises contacting the membrane with a solution comprising the at least one given counterion that modulates the uncharged solute selectivity of the LLC polymer membrane as compared to the LLC polymer membrane wherein a control inactive counterion is located in the at least one pore. In other embodiments, the at least one counterion is selected from the group consisting of optionally substituted liner, branched, or cyclic $C_1$-$C_6$ alkanesulfonate, optionally substituted benzenesulfonate, optionally substituted naphthalenesulfonate, optionally substituted trifluoromethanesulfonate, and optionally substituted camphorsulfonate. In other embodiments, the at least one given counterion is selected from the group consisting of optionally substituted alkyl- or aromatic-based carboxylates, including but not limited to propionate and benzoate, as well as optionally substituted alkyl- or aromatic-based phosphonates, including but not limited to methylphosphonate and phenylphosphonate.

In other embodiments, the counterion is a poly(anionic) molecule that contains multiple, covalently bonded anionic functional groups such as sulfonates, carboxylate, and/or phosphonate groups. Non-limiting examples of such molecular poly(anions) are aryl- or alkyldisulfonates (e.g., benzene 1,3-disulfonate and 1,3-propanedisulfonate), aryl- and alkyldicarboxylates (e.g., benzene 1,3-dicarboxylate and 1,3-propanedicarboxylate), and/or aryl- or alkyldiphosphonates (e.g., benzene 1,3-diphosphonate and 1,3-propanediphosphonate).

In certain embodiments, the at least one pore has a structure selected from the group consisting of type I bicontinuous cubic ($Q_I$) LLC phase structure, and inverted hexagonal ($H_{II}$) LLC phase structure.

In certain embodiments, the method comprises replacing the at least one first anionic counterion with at least one second anionic counterion, wherein the effective pore size and/or solute rejection of the membrane comprising the at least one first anionic counterion is distinct from that comprising the at least one second anionic counterion.

In certain embodiments, the method comprises contacting the first solution with the first surface of the membrane, whereby a second solution with a lower concentration of the uncharged solute than the first solution is formed on the second surface of the membrane.

In certain embodiments, the polymer is formed by polymerization of at least one polymerizable LLC monomer selected from the group consisting of monomers 1-6, and any combinations thereof. In certain embodiments, the polymer is formed by polymerization of at least one polymerizable LLC monomer 2a.

In certain embodiments, the at least one anionic counterion is selected from the group consisting of methanesulfonate, ethanesulfonate, 1-propanesulfonate, 2-propanesulfonate, benzenesulfonate, p-toluenesulfonate, m-toluenesulfonate, o-toluenesulfonate, α-naphthalenesulfonate, β-naphthalenesulfonate and camphorsulfonate.

In other embodiments, the at least one counterion is selected from the group consisting of optionally substituted liner, branched, or cyclic $C_1$-$C_6$ alkanesulfonate, optionally substituted benzenesulfonate, optionally substituted naphthalenesulfonate, optionally substituted trifluoromethanesulfonate, and optionally substituted camphorsulfonate. In other embodiments, the at least one given counterion is selected from the group consisting of optionally substituted alkyl- or aromatic-based carboxylates, including but not limited to propionate and benzoate, as well as optionally substituted alkyl- or aromatic-based phosphonates, including but not limited to methylphosphonate and phenylphosphonate.

In other embodiments, the counterion is a poly(anionic) molecule that contains multiple, covalently bonded anionic functional groups such as sulfonates or carboxylate groups. Non-limiting examples of such molecular poly(anions) are aryl- or alkyldisulfonates (e.g., benzene 1,3-disulfonate and 1,3-propanedisulfonate) and aryl- and alkyldicarboxylates (e.g., benzene 1,3-dicarboxylate and 1,3-propanedicarboxylate).

In certain embodiments, the LLC polymer is embedded within a porous support membrane or deposited as a layer on the surface of a porous support membrane.

In certain embodiments, the replacing step comprises contacting the nanoporous LLC polymer membrane with a solution comprising the at least one second anionic counterion.

In certain embodiments, the at least one first anionic counterion has a distinct molecular volume ($V_{mol}$) from the at least one second anionic counterion.

In certain embodiments, the membrane comprising the at least one second anionic counterion has distinct % rejection for an uncharged solute than the membrane comprising the at least one first anionic counterion.

In certain embodiments, the Stokes diameter of the uncharged solute is approximately equal to the effective pore radius for the membrane comprising the at least one second anionic counterion.

In certain embodiments, the effective radius for the at least one pore of the membrane is about equal to or lower than the Stokes diameter of the uncharged solute.

In certain embodiments, the LLC polymer is embedded within a porous support membrane or deposited as a layer on the surface of a porous support membrane.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. Although the description herein contains many embodiments, these should not be construed as limiting the scope of the invention but as merely providing illustrations of some of the presently preferred embodiments of the invention.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application. In general, the terms and phrases used herein have their art-recognized meaning, which can be found by reference to standard texts, journal references and contexts known to those skilled in the art. Any preceding definitions are provided to clarify their specific use in the context of the invention.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Materials and Instrumentation

All reagents, solutes, and sodium organosulfonate salts were purchased as reagent-grade materials from Sigma-Aldrich or TCI America. The ultrafiltration polysulfone support, PS35 (20 kDa MWCO), was purchased dry from Nanostone Water, Inc. De-ionized (DI) water with a conductivity <2 µS/cm used for all feed and soak solutions. DI water with <0.15 mg/L total organic carbon (TOC) was used for TOC analysis sample dilutions.

NMR spectroscopy was performed using a Bruker Avance-III 300 NMR spectrometer (300 MHz for $^1H$). Films were cast using an MTI Corporation automatic film coater (MSK-AFA-III-110) equipped with a 0.95 cm diameter #3 wire-wound rod from the Paul N. Gardner Company. Films were annealed with a temperature programmed XTREME® hot/cold plate from LR Technologies and radically photo-polymerized in a Coy Labs polymer glove box purged with dry $N_2$ gas ($O_2$ content <3%, as measured by an Alpha Omega OXY-SEN sensor). $Q_I$ samples were radically photo-cross-linked between quartz plates using a Spectroline XX-15A 365 nm UV lamp (1 mW cm$^{-2}$ at the sample surface). The LLC order in the polymerized films was evaluated using an Inel CPS 120 powder X-ray diffraction (PXRD) system with a monochromated Cu $K_\alpha$ radiation source. The PXRD system was calibrated with silicon and silver behenate standards purchased from NIST and Kodak (Huang, et al., 1993, J. Appl. Crystallogr. 26:180-184). Samples requiring more peak resolution than could be provided by the PXRD were characterized by small-angle X-ray scattering (SAXS) using a Rigaku SAXS system with a Cu rotating anode equipped with a 2D multi-wire detector. The optical character of bulk films was evaluated via polarized light microscopy (PLM) using a Leica DMRXP polarized light microscope with a Q-imaging MicroPublisher 3.3 RTV digital camera. Bulk films and TFC membranes were imaged via scanning electron microscopy (SEM) using a JEOL JSM-6480LV scanning electron microscope; the qualitative presence of various elements was evaluated via energy-dispersive X-ray spectroscopy (EDS) using INCA software. Filtration experiments were run using custommade, stainless steel, stirred dead-end filtration units having a feed volume of 25 mL and an active membrane area of 2.8 cm² (for 2.5-cm-diameter samples). The concentrations of single uncharged solute solutions were measured via TOC using a Sievers 5310C Laboratory TOC Analyzer. TOC samples were prepared in glass vials muffled in a Lindberg Blue M furnace by Thermo Scientific.

Fabrication and Characterization of the Bulk Film and TFC $Q_I$ Polymer Membranes Monomer 2a was synthesized according to Carter, et al., 2012, Chem. Mater. 24:4005-4007. Monomer 2a can form the $Q_I$ LLC phase in an unsupported bulk film (ca. 200 μm thick) or in a thin film (ca. 5 μm thick) as the skin layer of a TFC membrane; the formulation and fabrication procedures for both these forms of $Q_I$-phase films are provided for example in Carter, et al., 2012, Chem. Mater. 24:4005-4007; Carter, et al., 2014, J. Membr. Sci. 455:143-151). The only deviations from the procedures reported in prior work are the use of an automatic roll-casting machine and a different commercial support for the fabrication of the TFC membranes. The LLC order in the polymerized bulk films was evaluated with both PXRD and PLM, while the order in the polymerized LLC phase of the skin layer isolated from a TFC membrane was evaluated by PXRD.

Anion Exchange and Characterization of the $Q_I$ Polymer Material

Due to the small amount of LLC selective layer present in the TFC $Q_I$ membrane compared to the support material, evaluating the degree of anion-exchange was difficult with the TFC $Q_I$ membranes. Since the bulk $Q_I$ polymer films are more than an order of magnitude thicker than the LLC layer present in the TFC $Q_I$ membranes, conditions found to completely anion-exchange the bulk films were employed on the TFC membranes and assumed to completely exchange them as well (Carter, et al., 2014, J. Membr. Sci. 455:143-151). To induce anion-exchange, bulk films were soaked at room temperature in highly concentrated salt solutions, followed by a DI water wash. To confirm soak conditions that yield complete anion-exchange in the bulk films, the relative amounts of different anion species in the bulk film cross-sections were evaluated using SEM/EDS. The soak conditions that afforded complete anion-exchange in the bulk $Q_I$ films were then used on the TFC $Q_I$ membranes.

Dead-End Aqueous Filtration Experiments

Circular TFC $Q_I$ membrane discs (4.9 cm²) were cut from a TFC $Q_I$ membrane sheet and soaked under the conditions necessary to induce complete anion-exchange for the given anion. Upon completion of the anion-exchange, the discs were loaded into the dead-end filtration units resulting in an exposed membrane area of 2.8 cm². The feed side of the filtration cell was then filled with DI water and brought to a pressure of 27.6 bar over a period of 12 min using nitrogen gas. DI water was then run through the system until at least 5 mL of permeate was collected; initial flux readings were taken. Then, the feed was changed to a 2000 mg/L aqueous solution of one of the uncharged solutes (sucrose, glucose, glycerol, or ethylene glycol), and the system was allowed to come to steady state by passing 5 mL of permeate. Then, three sequential permeate samples of 1-5 mL each were collected, and samples were stored in the fridge for TOC analysis. Permeate and feed samples were diluted with DI water into the range of 2-15 mg/L carbon for TOC analysis. Anion-exchanged membranes were tested in triplicate and with a control membrane having the original bromide anion still present.

Membrane performance was evaluated in terms of water permeance and solute rejection. Water permeance (J) was calculated using Equation 1:

$$J = \frac{V_{perm} \times d}{AtP} \quad \text{(Equation 1)}$$

where $V_{perm}$ is the volume of permeate collected, d is active layer thickness (about 5 μm for the TFC $Q_I$ membrane), A is the exposed area of the membrane (2.8 cm²), and t is the time it took to collect that volume of permeate, and P is the applied pressure (27.6 bar).

Percent rejection (Rej) was calculated using Equation 2:

$$Rej = \left(1 - \frac{C_{perm}}{C_{feed}}\right) \times 100 \quad \text{(Equation 2)}$$

where $C_{perm}$ and $C_{feed}$ are the solute concentrations in the permeate and feed, respectively.

Analysis

This research uses two models as a way of analyzing the rejection results in order to explore the system as a whole. These models provide insight about what is occurring and help predict the response that would be induced by anions not included in the scope of this work.

Effective Pore Radius Calculations Using the One-Parameter Model

The one-parameter model, a Nernst-Planck-based model that includes hindered transport in the pores, can determine the effective pore radius of a given membrane through fitting this model to experimentally observed rejection values of uncharged solutes with established molecular dimensions (Bowen & Welfoot, 2002, Chem. Eng. Sci. 57:1121-1137). This model takes into account transport by both convection and diffusion but only includes steric interactions. This model is effective at modeling the performance of NF membranes in general, and has been used to calculate the effective pore radius in $Q_I$ LLC polymer membranes. In prior pore radius modeling work, the annular nanopores of the $Q_I$ phase were treated as a laterally packed collection of cylinders of the same diameter throughout the material. This structural approximation produced the best prediction of uncharged solute rejection compared to the observed values. Therefore, the one-parameter model developed for cylindrical pores of uniform size was used here as well to observe how the resident anion impacts the effective pore radius. The quality of fit of the model to the experimental data is evaluated by the standard error.

Correlation of Anion Properties with Rejection Behavior Through Empirical Modeling An empirical model was used to develop a correlation between the physicochemical properties of the anion associated at the pore wall and the observed rejection results. The physicochemical properties of the anions (Table 5) were collected from chemicalize dot org (April 2016). The two physicochemical properties that have significant influence on uncharged solute rejection are size and hydrophobicity. Anion size is represented by the molecular volume ($V_{mol}$, in Å³) because this measure is less sensitive to the orientation of the resident anion at the pore wall. Hydrophobicity is represented by the octanol-water partition coefficient (log P). The adjusted coefficient of determination (adjusted $R^2$) was used to evaluate the quality of fit of each of the empirical models explored. As in the case of the one-parameter model, the standard error was used to evaluate the overall quality of fit of the empirical model to the entire set of data.

Example 1

Inducing Complete Anion-Exchange in Bulk Films

Polymerized, unsupported LLC bulk films were used to determine the conditions for complete anion-exchange. Bulk films were exposed to the salt soaking conditions presented in Table 1, depending on the organosulfonate anion, and then soaked in DI water for 24 h. For both salt and DI soaking, the solution was replaced every 12 h.

TABLE 1

Conditions (concentration and salt soak duration) used to induce complete anion-exchange of the bulk $Q_I$ films for each organosulfonate anion used.

| Anion | Aq. Soak Solution Concentration (M) | Soak Duration (days) |
| --- | --- | --- |
| bromide (control) | 0 | 2 |
| methanesulfonate | 1 | 2 |
| 2-propanesulfonate | 0.2 | 1 |
| benzenesulfonate | 0.5 | 2 |
| naphthalenesulfonate | saturated | 4 |

Figure 6:
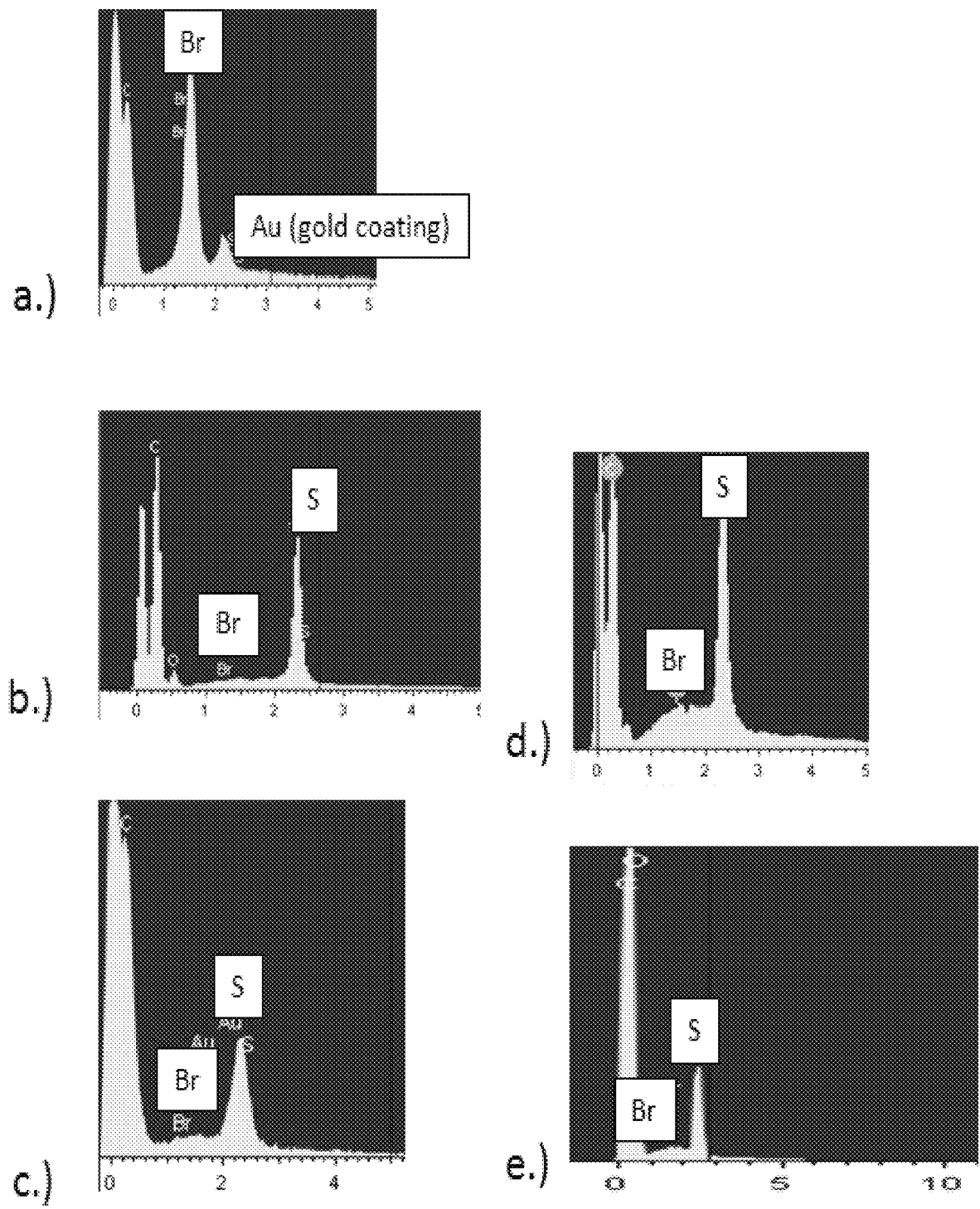
FIG. 6 comprises EDS spectra of bulk films showing the relative amounts of elemental Br (indicative of the original bromide ion in the pristine $Q_I$ polymer film of 2a) and S (indicative of the organosulfonate exchanged in): (a) bromide (control), (b) methanesulfonate, (c) 2-propanesulfonate, (d) benzenesulfonate, and (e) naphthalenesulfonate.

To confirm that anion-exchange reached near completion, EDS was used to analyze the elements present. Bulk films were freeze-fractured under liquid $N_2$ so that the center of the cross-section could be analyzed with EDS (FIG. 6). The control was coated with gold to increase imaging capacity; the gold peak is in the same region as the sulfur peak. For the anion-exchanged films the elemental bromine peak was diminished and the elemental sulfur peak was dominant. EDS was not used to quantify the amount of exchange; if the concentration of Br was below 1 wt % (the detection limit of the method), it was assumed to be completely exchanged out. All the organosulfonate-exchanged films met this requirement, demonstrating that complete anion-exchange was achieved.

Example 2

Characterization of Anion-Exchanged Bulk and TFC $Q_I$ Films

Figure 7:
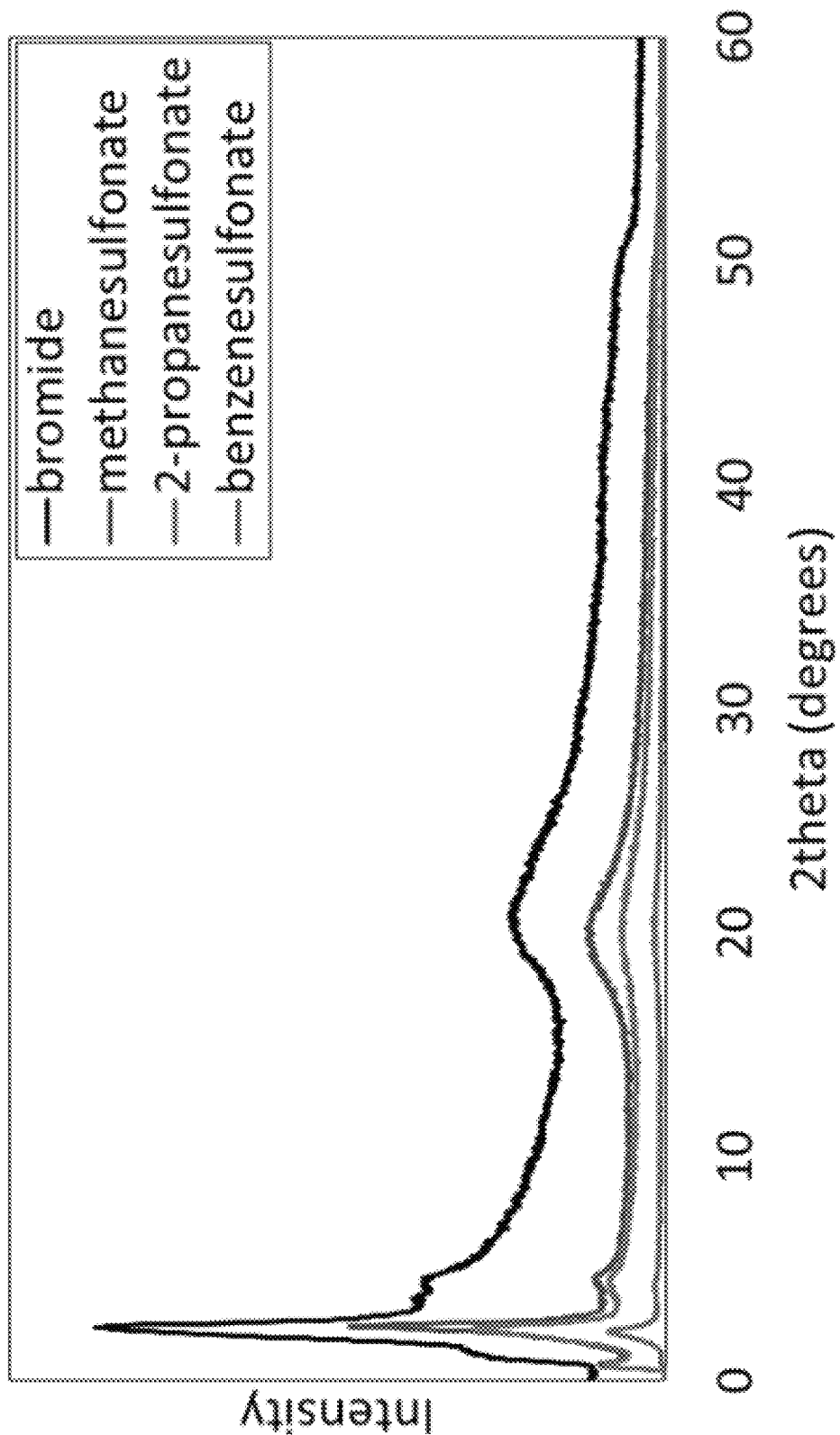
FIG. 7 comprises a graph illustrating PXRD spectra of bulk films showing the profiles of the initial control $Q_I$ film of 2a containing bromide before any anion-exchange, and the organosulfonate-exchanged films.

After anion-exchange, the LLC phase of the bulk films was evaluated via PXRD (FIG. 7). The peak below 1.5 degrees in 2theta is an artifact of the machine. Each film demonstrated one LLC peak around 2.3 degrees in 2theta, suggesting similar structure to the original bromide control. This peak corresponds to the $1/\sqrt{6}$ d-spacing, while the peak around 5 degrees in 2theta corresponds to the $1/\sqrt{22}$ d-spacing peak, both characteristic of a Q phase. Intensity of the signal is a function of amount of material in the beam path and duration of spectra collection, therefore it is not quantified here.

Figure 8:
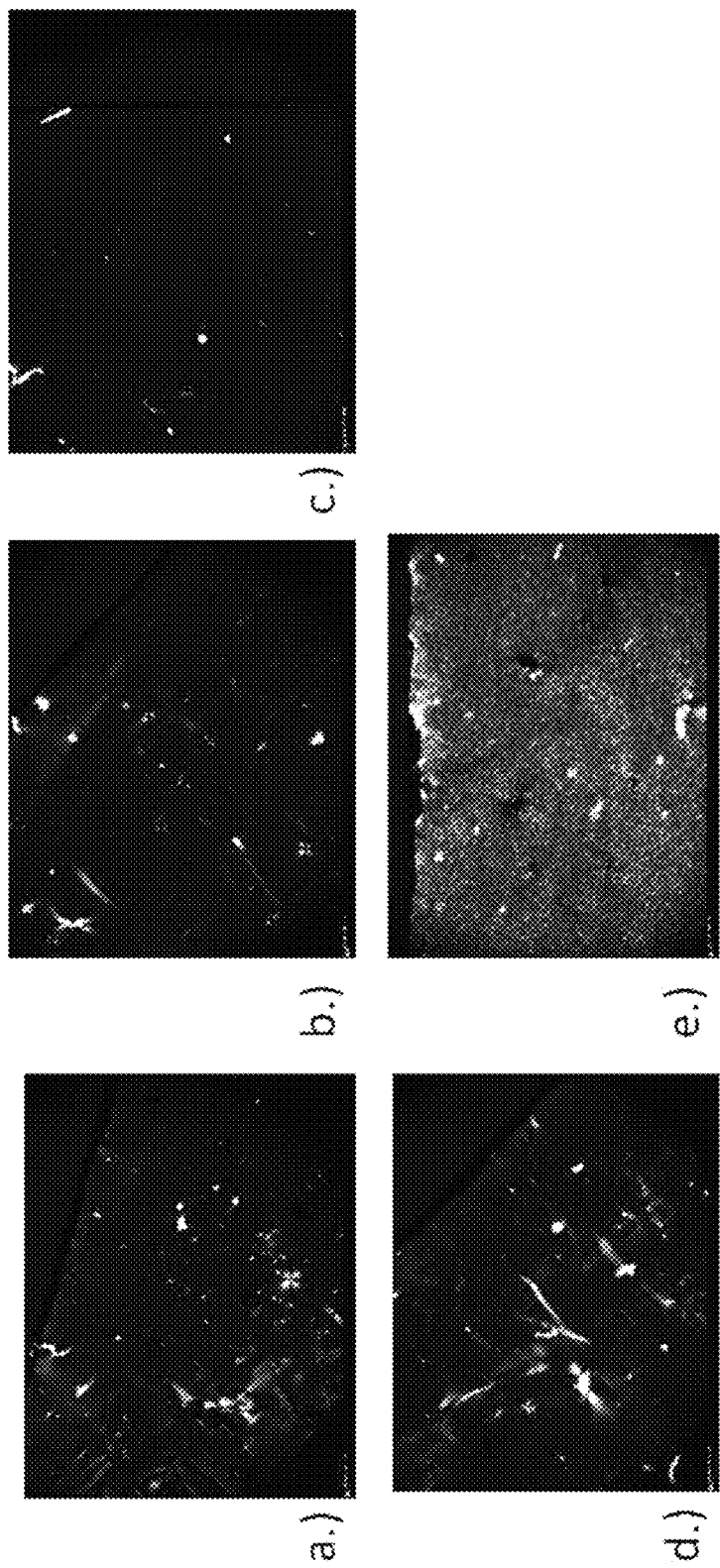
FIG. 8 comprises PLM images for (a) initial $Q_I$ polymer film of 2a containing bromide before anion-exchange, and (b) methanesulfonate-, (c) 2-propanesulfonate-, (d) benzenesulfonate-, and (e) naphthalenesulfonate-exchanged bulk films. Magnification=5× in all cases.

PLM was used to confirm the LLC phase of the bulk material when only one PXRD peak was clearly distinguishable (FIG. 8). All these films except the naphthalenesulfonate-exchanged bulk film appeared black under PLM, suggesting they had psuedo-isotropic/cubic symmetry. The naphthalenesulfonate-exchanged bulk film shows a slightly brighter, textured image, suggesting anisotropy.

Figure 9A:
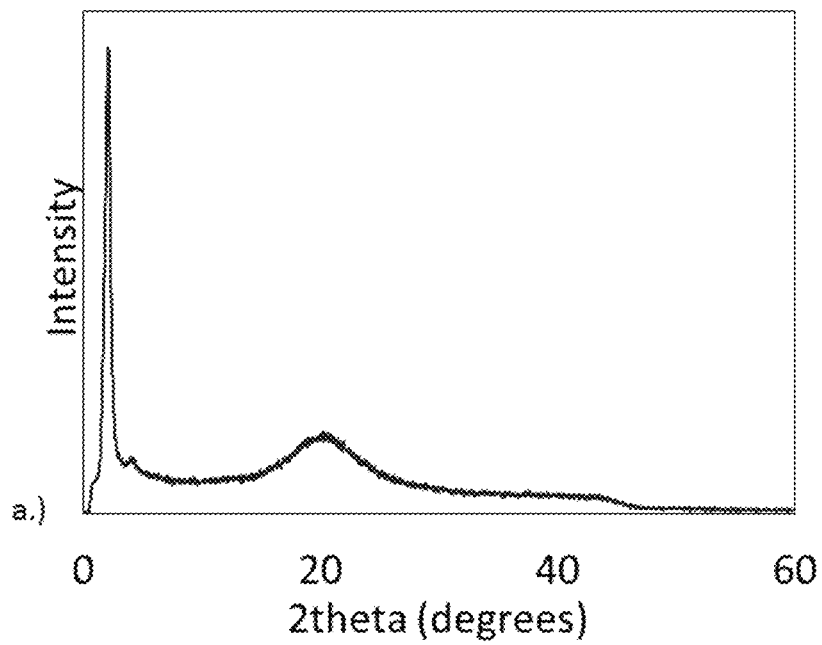
Figure 9B:
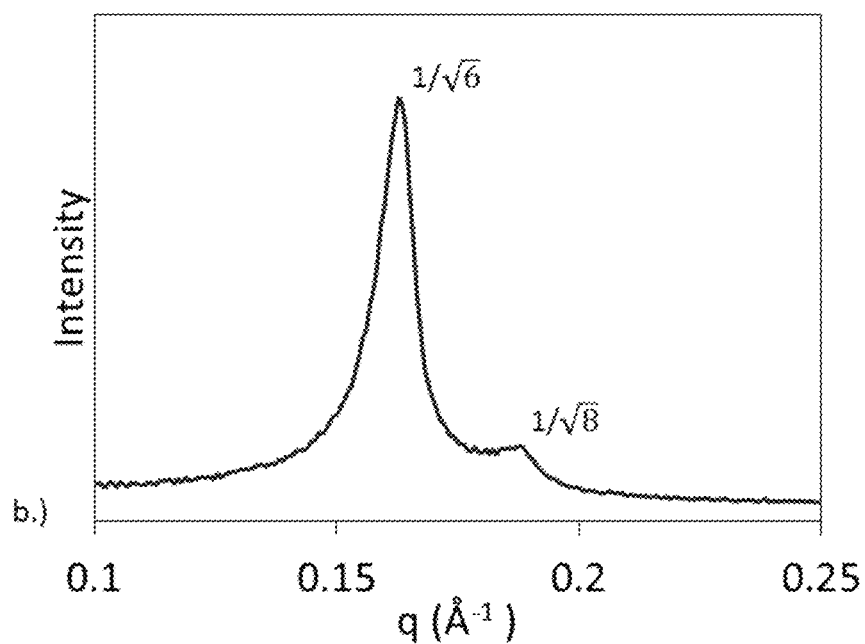

The PXRD spectrum for the naphthalenesulfonate-exchanged bulk films of cross-linked 2a only shows an intense main $1/\sqrt{6}$ d-spacing peak, plus an additional weaker $1/\sqrt{22}$ d-spacing peak that can also be indexed a Q LLC phase (FIG. 9A). However, the SAXS spectrum of the same material offers further resolution of the region near the intense main $1/\sqrt{6}$ peak. The dominant and shoulder peaks shown in the higher-resolution SAXS spectrum correspond to the $1/\sqrt{6}:1/\sqrt{8}$ d-spacings characteristic of a Q LLC phase (FIG. 9B).

Figure 10:
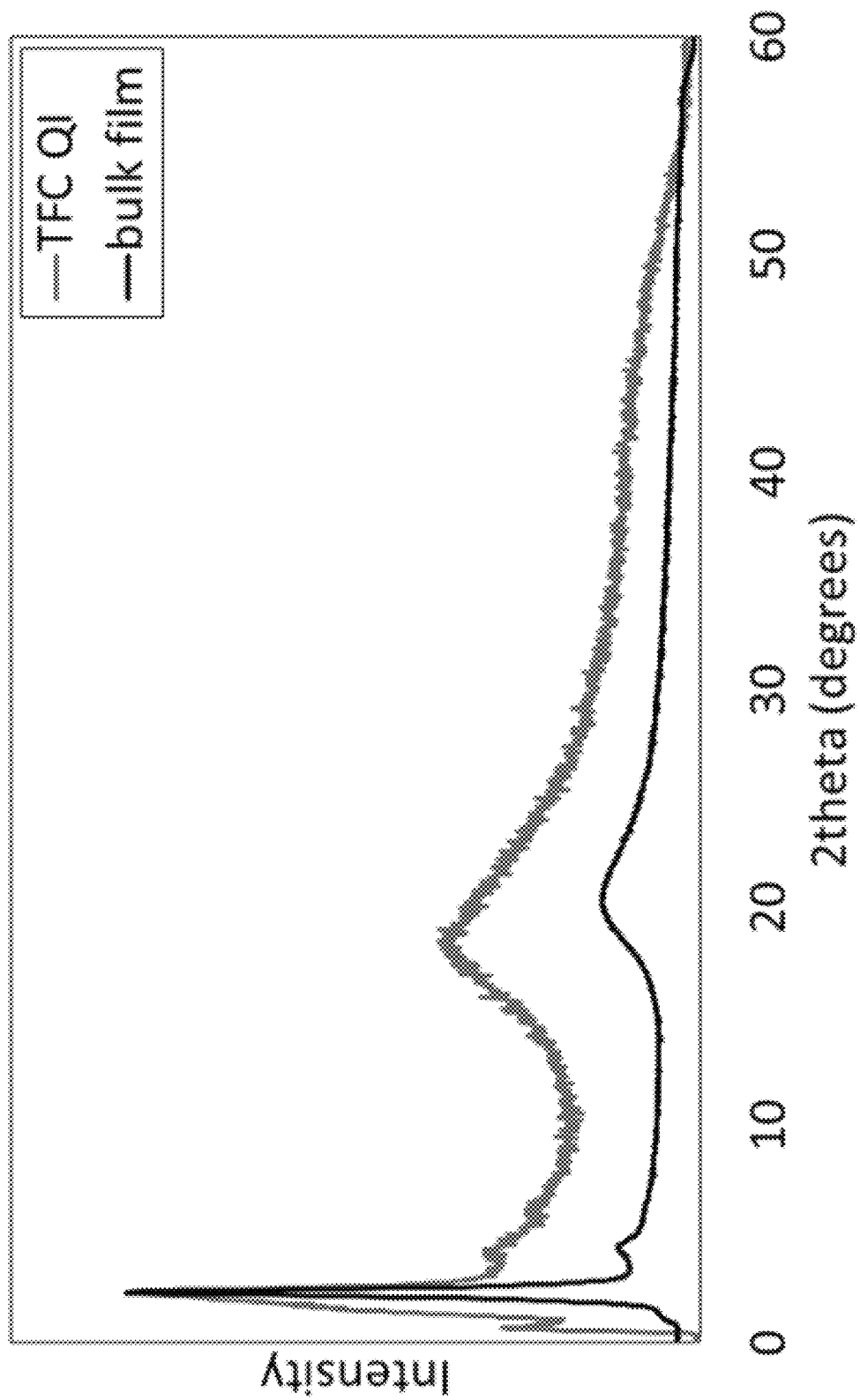

The PXRD spectra in combination with PLM images confirm that the pore structure, namely the Q phase, was maintained for all organosulfonate anions exchanged-in. For the discrepancy present in the case of naphthalenesulfonate, SAXS confirmed the presence of the Q phase. All of these analyses were done with unsupported bulk film samples. Due to the small amount of LLC material present in the TFC $Q_I$ membrane relative to the commercial support material, the LLC phase is difficult to characterize in the TFC membrane. However, a comparison of the PXRD spectrum of the TFC membrane to the PXRD spectrum of an unsupported bulk film polymerized under the same conditions (FIG. 10) suggests that the nanostructure of the TFC membrane is very similar to that of the polymerized bulk film. Given the similarity in the ordered morphology between the TFC $Q_I$ membranes and the bulk films, the materials were assumed to be anion-exchanged to the same degree with retention of the LLC phase structure. Conditions and characterization that afforded complete anion-exchange in the bulk films were applied the TFC membranes.

Figure 11:
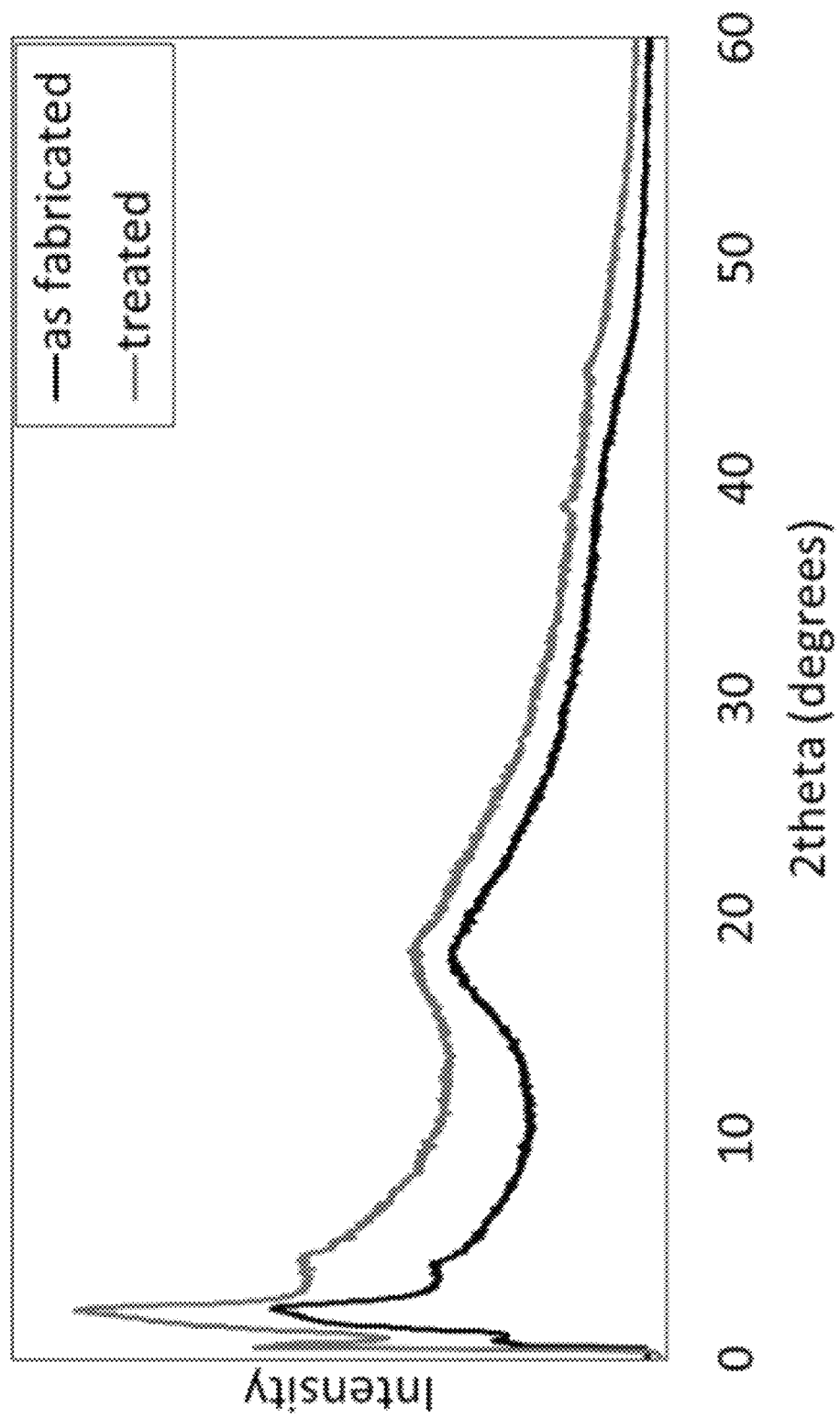
FIG. 11 illustrates PXRD spectra of TFC $Q_I$ membrane samples from the same membrane case, one is the spectra of the original membrane, while the other (treated) is from the sample exchanged to naphthalenesulfonate and used in filtration.

In order to demonstrate that the LLC material does not experience significant deterioration during filtration, PXRD was used to evaluate the nanostructure of the TFC $Q_I$ membrane as fabricated and the TFC $Q_I$ membrane after exchange to naphthalenesulfonate and 114 days of continuous filtration (FIG. 11). The post-filtration membrane sample exhibited a very similar PXRD profile to the original, "as-fabricated" membrane, suggesting that the nanostructure of the material is still intact and that there was no significant degradation.

Example 3

Comparison of TFC $Q_I$ Performance with Commercial Membranes

Figure 12:
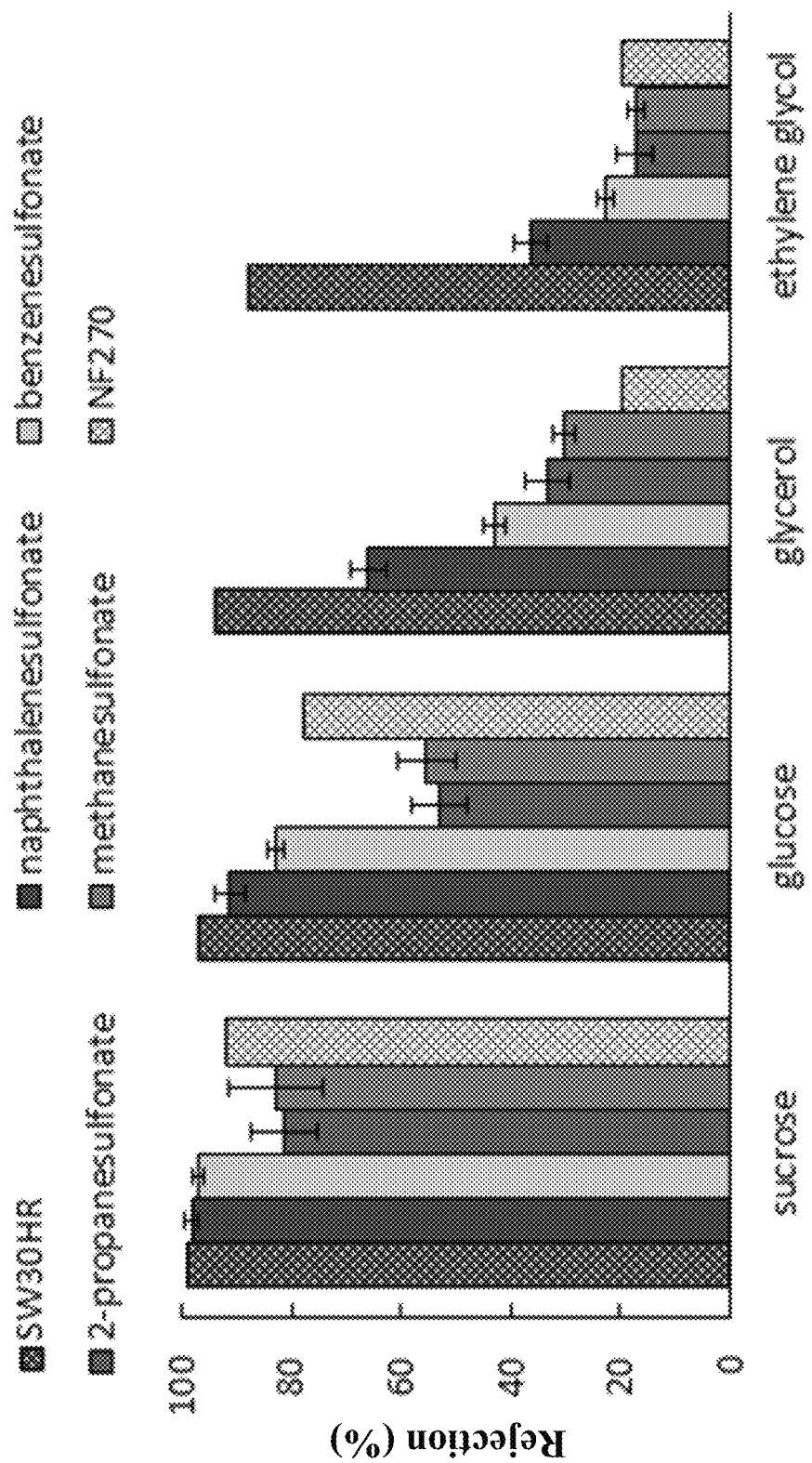
FIG. 12 comprises a bar graph illustrating uncharged solute rejections of TFC $Q_I$ membranes of 2a anion-exchanged with the organosulfonate anions. Also included is the uncharged solute rejection of a commercial RO membrane (SW30HR) and a commercial NF membrane (NF270) (values for commercial membranes collected from Carter, et al., 2012, Chem. Mater. 24:4005-4007, FIG. S16 therein). The rejection values shown are averages values obtained from triplicate experiments. The error bars represent the 95% confidence interval.
Figure 13:
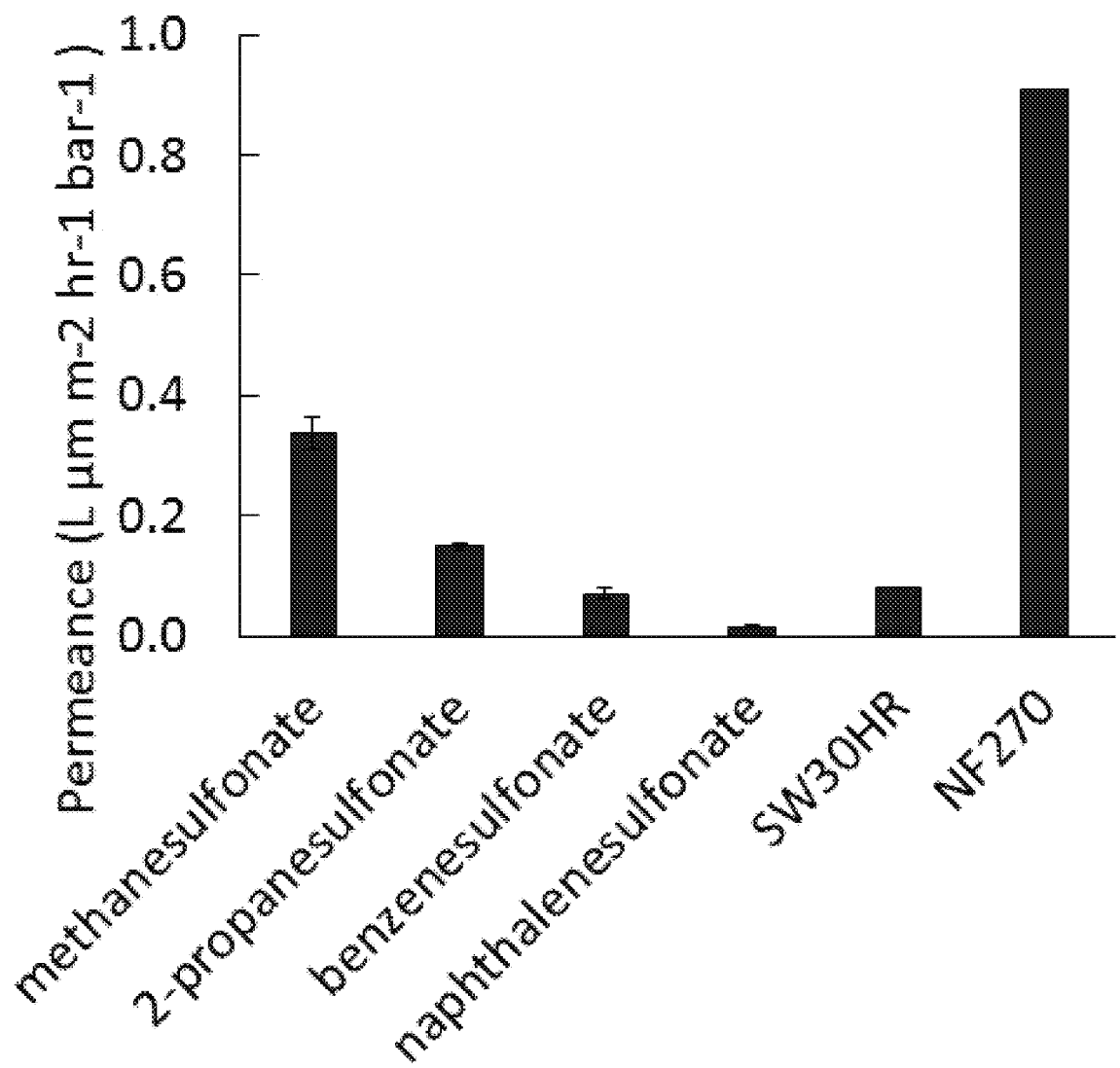
FIG. 13 comprises a bar graph illustrating average permeance values of certain organosulfonate-exchanged TFC $Q_I$ membranes with approximately the same selective layer thickness. Water permeance of commercial RO and NF membranes is also included. The values shown are the averages of triplicate experiments, and the error bars represent the 95% confidence interval.

Studies were conducted to understand where the TFC $Q_I$ nanopore material's performance stands in relation to that of commercial membranes. FIG. 12 illustrates the observed solute rejection results of organosulfonate-exchanged TFC $Q_I$ membranes from FIG. 3A alongside the solute rejection of commercial NF (NF270 by Dow Filmtec) and RO (SW30HR by Dow Filmtec) membranes. FIG. 13 compares the water permeance of organosulfonate-exchanged membranes to commercial RO and NF membranes. The rejection performance of the TFC $Q_I$ membrane is higher or lower than the commercial NF membrane depending on the resident anion and the uncharged solute. In terms of water permeance, the permeance of the exchanged TFC $Q_I$ membranes is higher or lower than that of the commercial RO membrane, depending on the resident anion. Both of these graphs demonstrate a significant range of performance achievable by the TFC $Q_I$ membrane by a simple switching of the resident anion.

Example 4

One-Parameter Model Fitting

The one-parameter model used to calculate the effective pore radius from the observed uncharged solute rejection is fully developed in Bowen & Welfoot, 2002, Chem. Eng. Sci. 57:1121-1137; a summary of the applicable equations is given in Table 2. The equation numbers provided refer to the numbering in Bowen and Welfoot's publication. The osmotic pressure difference, $\Delta\pi$, was calculated following the ASTM Standard D4516, where $m_i$ is molality of the solution. The effective pore radius for each organosulfonate-exchanged membrane was determined by minimizing the sum squared error between the experimental and theoretical (modeled) rejection for each solute simultaneously, using Excel's Solver. The constants used are provided in Table 3.

TABLE 2

Equations used to fit the one-parameter model to experimentally observed results.

| | | |
|---|---|---|
| Rejection | $Rej = 1 - \dfrac{C_p}{C_f}$ | (12) |
| Ratio of permeate concentration to feed concentration | $\dfrac{C_p}{C_f} = \dfrac{[\{K_c - Y\}\phi]\exp[Pe']}{\{K_c - Y\}\phi - 1 + \exp[Pe']}$ | (10) |
| Modified Peclet number | $Pe' = \dfrac{\{K_c - Y\}r_p^2}{8K_d D_\infty \eta_0}$ | (16) |
| Dimensionless variable | $Y = \dfrac{D_p V_s 8\eta}{RTr_p^2}$ | (9) |
| Solute pore diffusion coefficient | $D_p = K_d D_\infty$ | |
| Hindrance factor for convection | $K_c = (2 - \phi)(1.0 + 0.054\lambda - 0.988\lambda^2 + 0.441\lambda^3)$ | |
| Hindrance factor for diffusion | $K_d = (1.0 + 2.30\lambda - 1.154\lambda^2 + 0.224\lambda^3)$ | |
| Steric partition coefficient | $\phi = (1 - \lambda)^2$ | |
| Ratio of solute radius to pore radius | $\lambda = \dfrac{r_s}{r_p}$ | |
| Solvent viscosity within the pore | $\eta = \eta_0\left(1 + 18\left(\dfrac{d_{o2}}{r_p}\right) - 9\left(\dfrac{d_{o2}}{r_p}\right)^2\right)$ | (14) |
| Effective transmembrane pressure drop | $\Delta P_e = \Delta P - \Delta\pi$ | (1) |
| Osmotic pressure | $\pi = 8.308 * 0.9(T + 273.15)m_i$ | (A1.1) |

TABLE 3

Constant values used in the one-parameter model, with their units and sources.

| Property | Symbol | Value | Units | Source |
|---|---|---|---|---|
| radius of sucrose | $r_s$ | 4.7E−10 | m | [b] |
| radius of glucose | $r_g$ | 3.65E−10 | m | [b] |
| radius of glycerol | $r_{gly}$ | 2.6E−10 | m | [b] |
| radius of ethylene glycol | $r_{eg}$ | 2.14E−10 | m | [c] |
| bulk diffusion of sucrose | $D_{\infty s}$ | 5.2E−10 | m$^2$/s | [b] |
| bulk diffusion of glucose | $D_{\infty g}$ | 6.9E−10 | m$^2$/s | [b] |
| bulk diffusion of glycerol | $D_{\infty gly}$ | 9.5E−10 | m$^2$/s | [b] |
| bulk diffusion of ethylene glycol | $D_{\infty eg}$ | 1.135E−09 | m$^2$/s | [d] |
| partial molar volume of sucrose | $V_s$ | 0.000212 | m$^3$/mol | [e] |
| partial molar volume of glucose | $V_g$ | 0.000112 | m$^3$/mol | [e] |
| partial molar volume of glycerol | $V_{gly}$ | 0.00007084 | m$^3$/mol | [f] |
| partial molar volume of ethylene glycol | $V_{eg}$ | 0.00005442 | m$^3$/mol | [f] |
| bulk solvent viscosity | $\eta_0$ | 0.0009 | N s/m$^2$ | Engineering Toolbox |
| ideal gas constant | R | 8.314 | J/mol K | |
| diameter of a water molecule | $d_{o2}$ | 2.8E−10 | m | [a] |
| temperature | T | 298 | K | |

TABLE 3-continued

Constant values used in the one-parameter model, with their units and sources.

| Property | Symbol | Value | Units | Source |
|---|---|---|---|---|
| feed concentration | $C_f$ | 2000 | ppm | |
| applied transmembrane pressure drop | $\Delta P$ | 26.6 | bar | |

[a] Bowen & Welfoot, 2002, Chem. Eng. Sci. 57: 1121-1137.
[b] Bowen, et al., 1997, J. Membr. Sci. 126: 91-105.
[c] Hatakeyama, et al., 2011, J. Membr. Sci. 366: 62-72.
[d] Fernandez-Sempere, et al., 1996, J. Chem. Eng. Data 41: 47-48.
[e] Sato & Miyawaki, 2016, Food Chem. 190: 594-598.
[f] Kiyosawa, 1991, Biochim. Biophys. Acta 1064: 251-255.

The effective pore radius induced by a given anion was reported as the average value calculated from the triplicate membrane tests. The error provided with the average effective pore radius is the 90% confidence interval based on the variation between the triplicate runs. The ability of this model to describe the observed performance was evaluated using the calculation of the standard error between rejection predicted by the model ($Rej_{calc}$) and experimentally observed rejection ($Rej_{exp}$), as given by Equation 3:

$$S_y = \sqrt{\frac{\sum_1^j \sum_1^i \sum_1^n (Rej_{j,n,exp} - Rej_{j,n,calc})^2}{j \times i \times n - j \times p}} \quad \text{(Equation 3)}$$

where j represents the anion, i represents the solute, n represents the number of replicates, and p represents the number of parameters used to fit the model. The parameter used to fit the one-parameter model to experimental data was the pore radius ($r_{pore}$).

Example 5

Empirical Model Fitting

Two physicochemical properties were used in the development of the empirical model—hydrophobicity and molecular volume. The octanol-water partition coefficient (log P) was used as a measure of hydrophobicity and was calculated from the atomic components of the molecule by ChemAxon using Equation 4:

$$\log P_{octanol/water} = \log\left(\frac{[solute]_{octanol}}{[solute]_{water}^{un\text{-}ionized}}\right) \quad \text{(Equation 4)}$$

where the solute is the salt. The molecular volume ($V_{mol}$) provided by Chemicalize dot org was calculated from the van der Waals radii of the individual atoms and the presence of chemical bonds. This information source was chosen above others because it provided values for all the anions of interest, removing the concern of incomparable values due to differences in the calculation method. In the series of organosulfonate anions chosen here, log P increases with $V_{mol}$. This is because overall anion size was increased through the addition of carbon and hydrogen atoms to the hydrocarbon unit of the organosulfonate anion, so as to avoid the inclusion of other functional groups that might introduce confounding effects other than size and hydrophobicity. While other factors including surface morphology and hydrogen bonding impact uncharged solute rejection, these membrane characteristics are not changed during anion-exchange to the various organosulfonates of interest here. For this reason, only $V_{mol}$ and log P were of interest.

Figure 14:
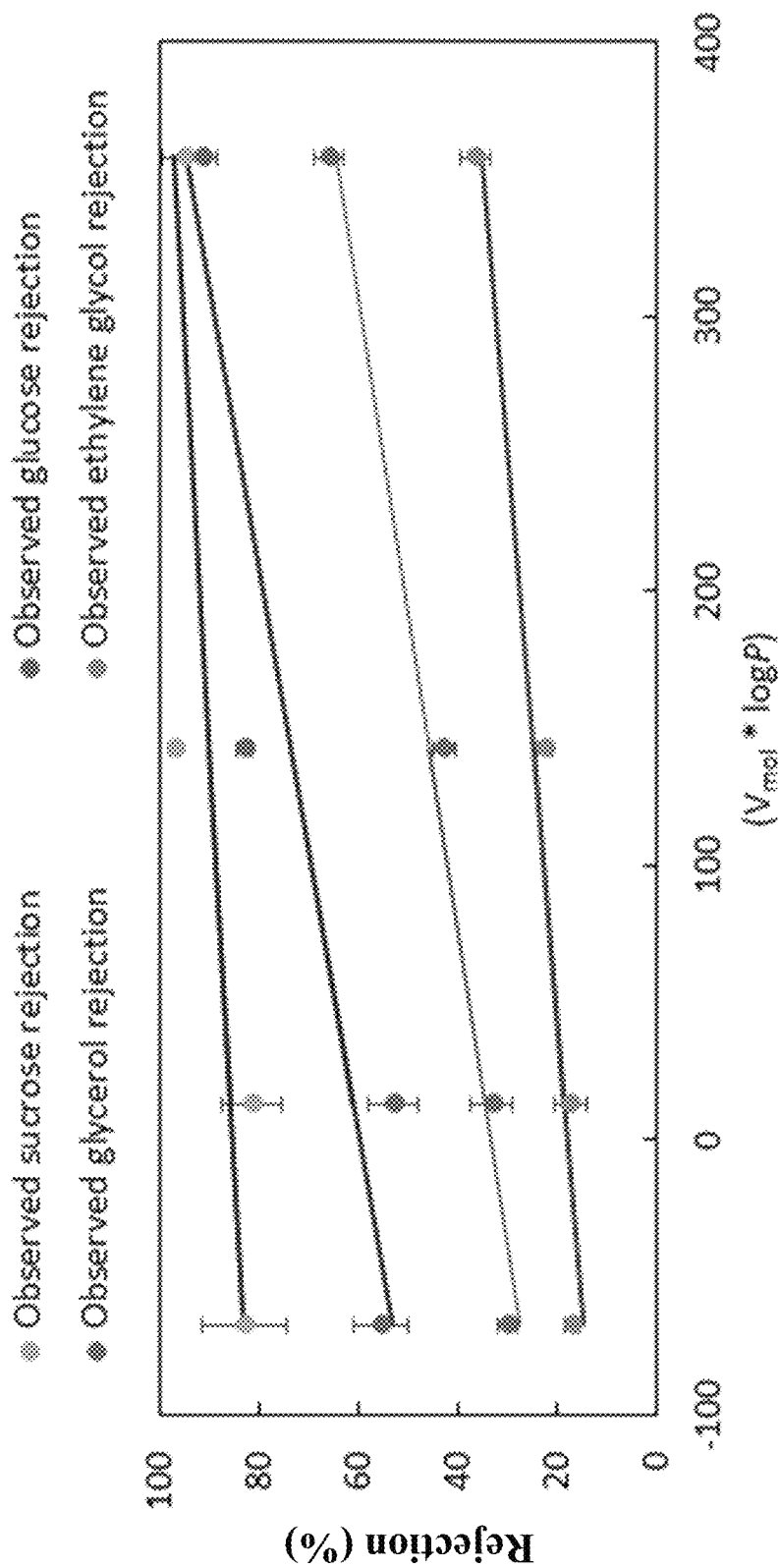
FIG. 14 comprises a graph illustrating an empirical model relating the rejection of each solute to the interaction of anion and log P is given by the solid line. Experimentally observed rejection values, shown as an average of triplicate experiments for each organosulfonate-exchanged TFC $Q_I$ membrane, are included as the sets of data points. The error bars associated with the experimentally observed rejections represent the 95% confidence interval.

The organosulfonate anion properties were correlated directly with rejection results through a single-term linear regression empirical model:

$$y = mx + b \quad \text{(Equation 5)}$$

where x is the single-term factor, y is the observed rejection, m is the fitted slope of the correlation, and b is the fitted intercept. Linear regression was evaluated for the rejection of each solute as a function of the various anion properties based on the adjusted coefficient of determination, adjusted $R^2$. FIG. 14 shows the fitted empirical relationship of rejection vs. ($V_{mol}$·log P) compared to the experimentally observed rejection for all uncharged solutes. Table 4 provides the adjusted $R^2$ values for the fit of each solute rejection and each anion property function investigated.

TABLE 4

Adjusted $R^2$ values for the fit of the linear regression model based on different anion properties. For each solute, the independent variable that produced the highest $R^2$ value is highlighted in yellow.

| | Single-factor terms (X) | | |
|---|---|---|---|
| Solute | $V_{mol}$ | logP | ($V_{mol}$ · logP) |
| sucrose | 0.344 | 0.405 | 0.400 |
| glucose | 0.708 | 0.771 | 0.784 |
| glycerol | 0.827 | 0.779 | 0.890 |
| ethylene glycol | 0.770 | 0.713 | 0.844 |
| water | 0.990 | 0.935 | 0.980 |

Figure 15:
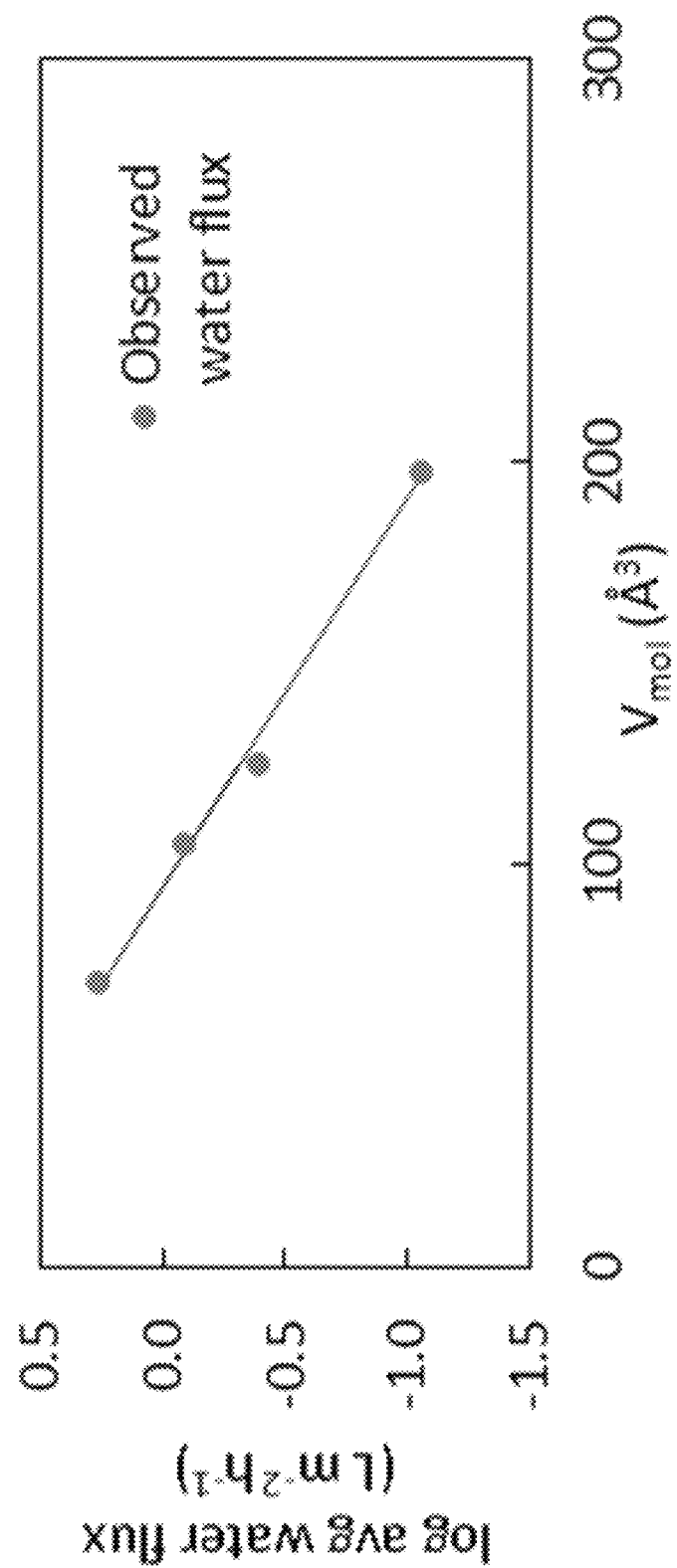
FIG. 15 comprises a graph illustrating empirical plot of the log of the average water flux against the $V_{mol}$ value of the resident anion. Experimentally observed flux, shown as an average of triplicate experiments for each organosulfonate anion, is included as the sets of data points.
Figure 16:
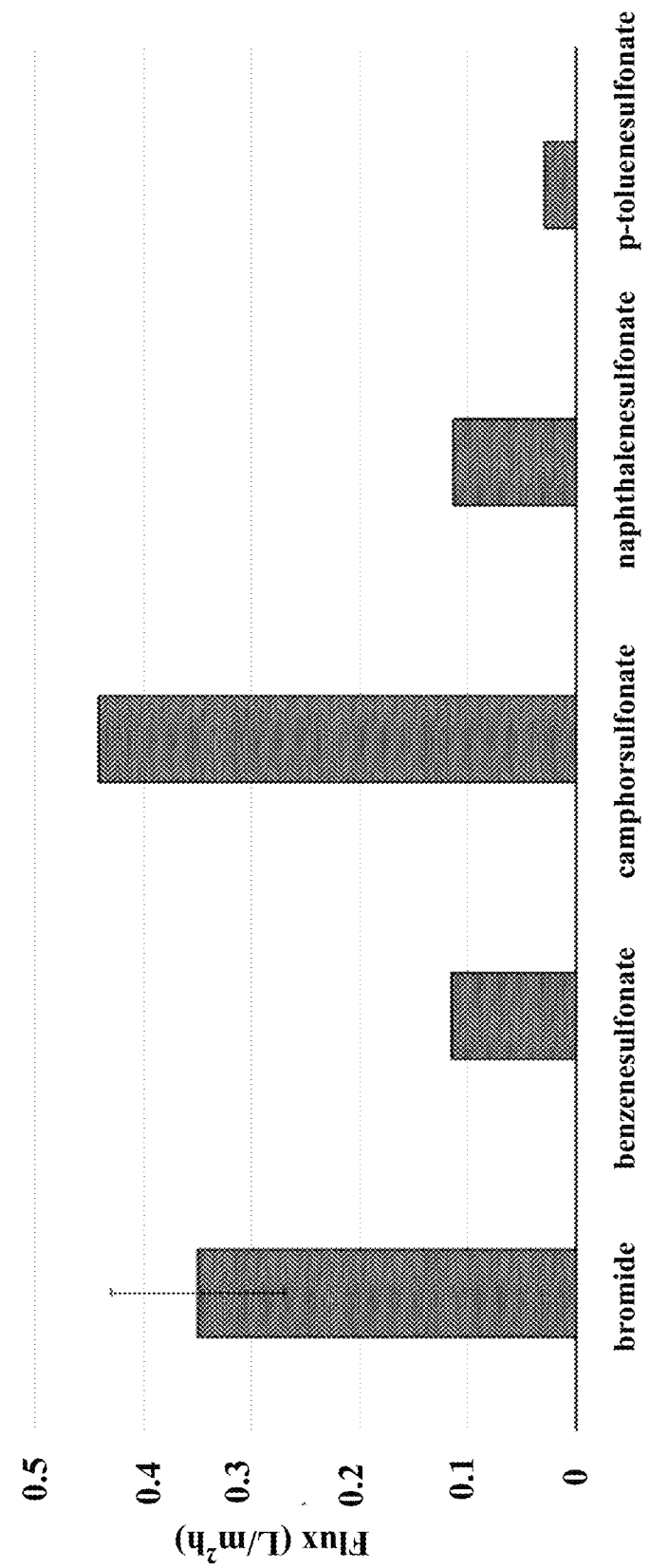
FIG. 16 comprises a bar graph illustrating DI water flux as a function of the anion associated at the pore wall. Control is bromide (left).

Since the experiments varied greatly in duration and water flux was more variable across the duration of the experiment, the average water flux for each organosulfonate-exchange experiment was used to fit the empirical model. However, the relationship between water flux and anion properties was clearly exponential, thus the log of the average flux was taken in order to achieve a linear relationship. FIG. 15 presents the experimentally observed water flux as well as the empirical model.

Equation 3 was used to calculate the standard error between this model and the experimentally observed rejection results. However, because this model groups the data by solute (i.e., the rejection of glycerol as a function of anion) as opposed to by anion (i.e., the rejection of an anion-exchanged membrane as a function of the uncharged solute being rejected), the "j×p" term is replaced by "i×p" in the denominator. The empirical model used two parameters: the slope and the intercept of the fitted line.

Example 6

Figure 2:
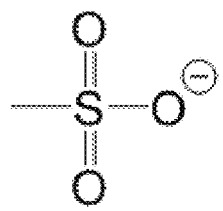
Figure 2:
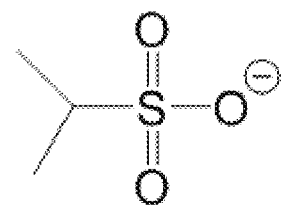
Figure 2:
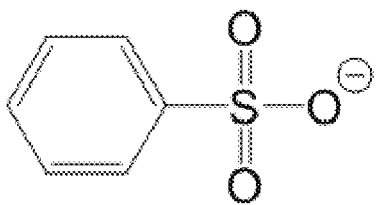
Figure 2:
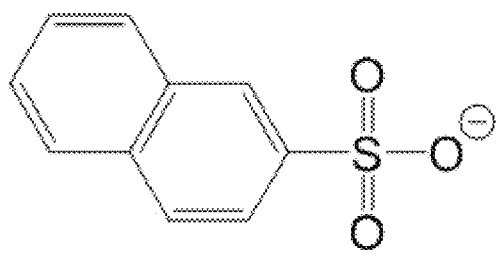
Figure 2:
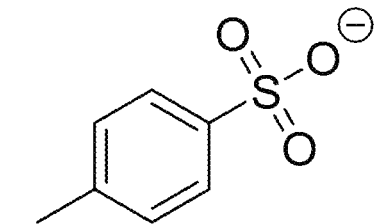
Figure 2:
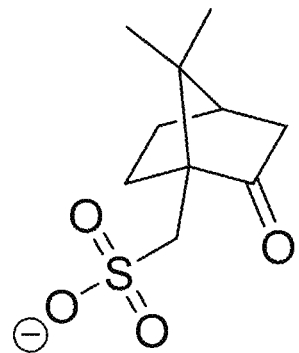

Studies on size selectivity in nanoporous LLC membrane materials were performed via anion-exchange. A set of commercially available anions of varying size was chosen (FIG. 2). Without wishing to be limited by any theory, organosulfonate anions were chosen. In one aspect, sulfonate is the monovalent anion with the highest affinity for the quaternary ammonium cation, which is very similar to the cationic imidazolium head group that forms the pore walls in the $Q_I$ system presented here. This means that organosulfonate anions are not easily displaced by other anions once it is associated at the pore wall. In another aspect, a variety of organosulfonates are commercially available, allowing for different subsets to be chosen to explore different types of properties for the resident anion. The chemical structures of the organosulfonate anions used are shown in FIG. 2, and their molecular weights, $V_{mol}$, and log P values are listed in Table 5.

TABLE 5

Molecular weights, $V_{mol}$, and logP values for the resident organosulfonate anions. (Chemicalize dot org, April 2016)

| Organosulfonate Anion | Mol. Wt. (g/mol) | $V_{mol}$ (Å³) | logP |
|---|---|---|---|
| methanesulfonate | 95.1 | 70.3 | −0.96 |
| 2-propanesulfonate | 123.1 | 104.4 | 0.12 |
| benzenesulfonate | 157.2 | 124.0 | 1.15 |
| naphthalenesulfonate | 207.2 | 167.2 | 2.14 |

Anion-Exchange of Bulk and TFC $Q_I$ Polymer Membranes: Conditions and Characterization While prior research has demonstrated the ability to completely exchange simple inorganic anions (e.g., other halides, nitrate) for the original bromide anions in the monomer 2a-based TFC $Q_I$ membrane, it cannot be automatically assumed that bulky organosulfonate anions would also be completely exchanged in. Therefore, it was necessary to first confirm that each of the organosulfonate anions presented in FIG. 2 and Table 5 can completely replace the bromide ions initially present in the polymerized $Q_I$ material. Because of the small amount of polymerized LLC selective layer present in the TFC $Q_I$ membranes compared to the amount of support material, accurately determining the degree of anion-exchange was difficult in the TFC $Q_I$ membranes. Consequently, protocols that afforded complete anion-exchange of unsupported bulk $Q_I$ polymer films were first developed and then applied to the TFC $Q_I$ membranes under the assumption that these protocols also completely exchange the TFC $Q_I$ membrane.

To achieve complete anion-exchange in the bulk $Q_I$ films, membranes were soaked in highly concentrated salt solutions at room temperature, followed by a DI water wash (specific exchange conditions for each anion are provided elsewhere herein). The degree of anion-exchange in the bulk films was determined by SEM imaging cross-sections of the exchanged films and determining the relative amounts of residual elemental bromine (from the original bromide ions) vs. the amount of elemental sulfur (from the introduced organosulfonate anion) using EDS. The EDS spectra, provided elsewhere herein, demonstrate that near-complete anion-exchange was achieved in the bulk films for each organosulfonate anion. This facile method of anion-exchange coupled with the reversibility of this process in the TFC $Q_I$ membranes suggest that the membrane would be vulnerable to anion-exchange when exposed to feed solutions containing ions. This work is proof-of-concept that the method is effective at manipulating pore selectivity.

With the occurrence of anion-exchange, the material must be re-characterized. Since nonpolymerizable LLCs change phase with a change in counterion, holding all else constant, it is necessary to confirm that a similar phase change did not occur during anion-exchange in these polymerized LLC films.

The retention of the $Q_I$ structure after anion-exchange was confirmed via analysis of the material's morphology by PXRD, PLM, and SAXS. LC and LLC phases can be quantitatively identified by PXRD if at least two peaks are present. The two most common PXRD peaks used to identify the Q phase are the $1/\sqrt{6}$ and $1/\sqrt{8}$ d-spacings. However, depending on the resolution of the PXRD instrument used and the degree of periodic order of the material, the typically lower-intensity $1/\sqrt{8}$ peak may or may not be distinguishable. In such cases, the presence of a single PXRD peak can be coupled with the PLM image to identify the specific LLC phase. The $Q_I$ phase has overall cubic symmetry and therefore produces a dark image, representative of a pseudo-isotropic material, in the presence of polarized light. Anisotropic LLC phases, however, generate a birefringent, or brightly textured, image in the presence of polarized light. Therefore, a material demonstrating a single LLC PXRD peak and a dark image on the PLM can be inferred to have cubic symmetry with a high level of confidence. Most of the organosulfonate-exchanged bulk films exhibited both a single LLC PXRD peak and a dark image on the PLM, demonstrating that the nanopore network formed by the $Q_I$ phase order was not lost during anion-exchange.

In contrast to the other organosulfonate-exchanged films, the bulk naphthalenesulfonate-exchanged film had a LLC peak in its PXRD spectrum but showed a bright, silver-textured image under PLM, which is inconsistent with a Q phase. SAXS analysis, affording better signal-to-noise and resolution, showed that the naphthalenesulfonate-exchanged film had the dominant $1/\sqrt{6}$ d-spacing peak and lower-intensity $1/\sqrt{8}$ shoulder peak indicative of a Q phase. This result confirmed that the $Q_I$ phase was present to a significant degree in the naphthalenesulfonate-exchanged bulk film, despite the birefringent PLM image. In conclusion, the Q phase was maintained after anion-exchange to each organosulfonate anion studied.

Performance of Anion-Exchanged TFC $Q_I$ Polymer Membranes

The organosulfonate-exchanged TFC $Q_I$ membranes were then tested for filtration performance under pressurized dead-end filtration conditions. Single-solute aqueous solutions were fed to the membranes, and uncharged solute rejection was calculated from the feed and permeate concentrations, as measured by TOC analysis. The pore size of the TFC $Q_I$ membranes made from 2a (prior to anion-exchange) are on the order of 1 nm (Carter, et al., 2012, Chem. Mater. 24:4005-4007). Thus, a range of uncharged solutes of <1 nm diameter (i.e., sucrose, glucose, glycerol, and ethylene glycol) was used to explore how the presence of these organosulfonate anions impacts uncharged solute rejection.

Figure 3A:
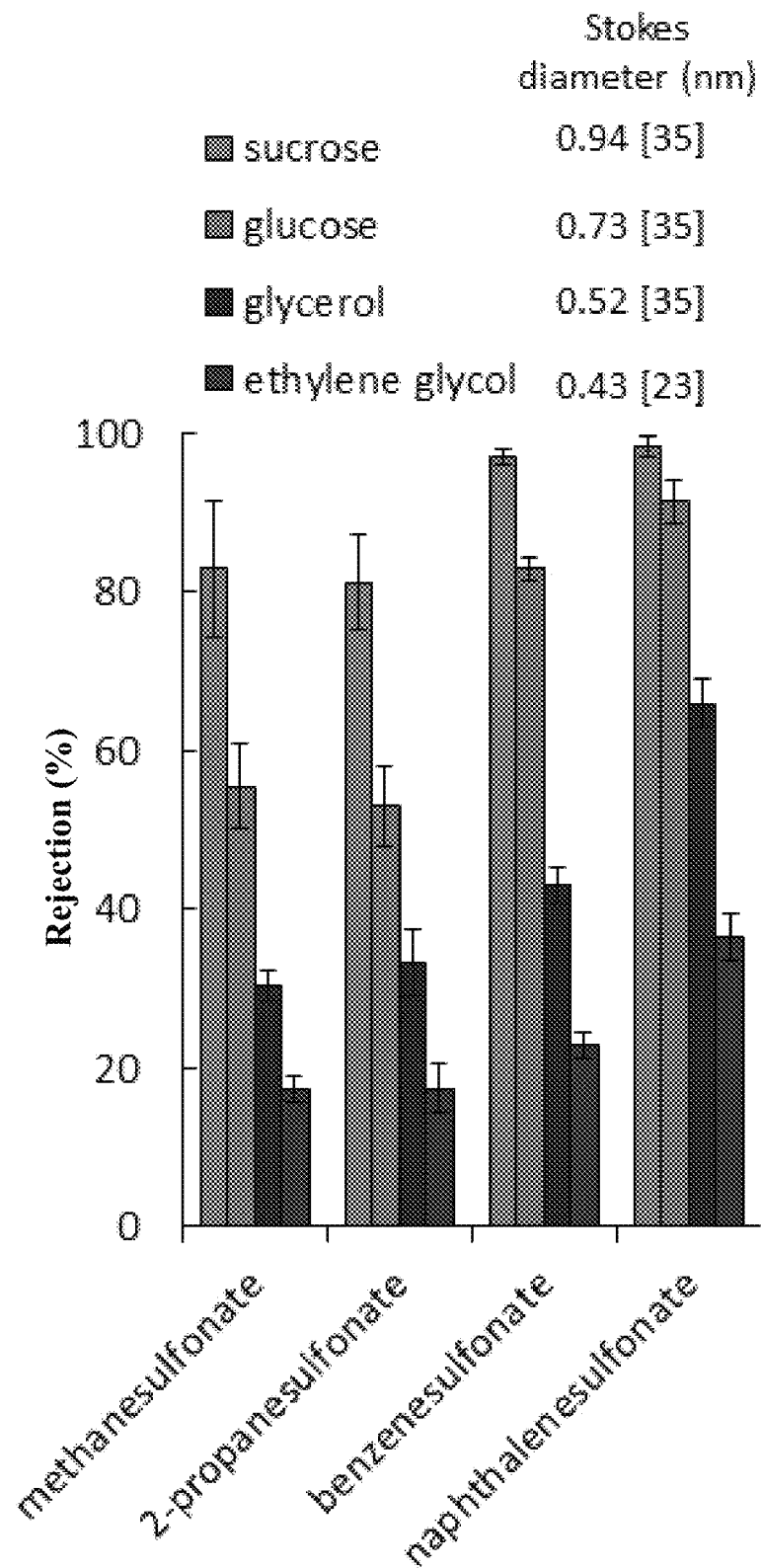
FIG. 3A comprises a bar graph illustrating uncharged solute rejections of TFC $Q_I$ membranes of 2a anion-exchanged with certain organosulfonate anions. The rejection values shown are average values obtained from triplicate experiments. The error bars represent the 95% confidence interval.

FIG. 3A presents the rejection of these uncharged solutes in the TFC $Q_I$ membranes exchanged with each organosulfonate anion tested. As can be seen in FIG. 3A, the uncharged solute rejection of the TFC $Q_I$ membranes depends significantly on the resident organosulfonate anion. While membranes containing methanesulfonate and 2-propanesulfonate rejected the solutes to the same extent, their rejection was significantly lower than those containing benzenesulfonate, which were significantly lower than those containing naphthalenesulfonate. In other words, three regimes of rejection performance can be seen from this set of results: small alkylsulfonates, organosulfonates with one benzene ring, and organosulfonates with two benzene rings. For all of the uncharged solutes tested except sucrose, the rejection significantly increased upon moving to a regime of a larger organosulfonate. In the case of sucrose, the observed rejection of two of the regimes was already close to the maximum value of 100% and a significant difference in the rejection should not be expected. This set of results demonstrates that the resident organosulfonate anion significantly impacts the uncharged solute selectivity of this $Q_I$ material.

Figure 3B:
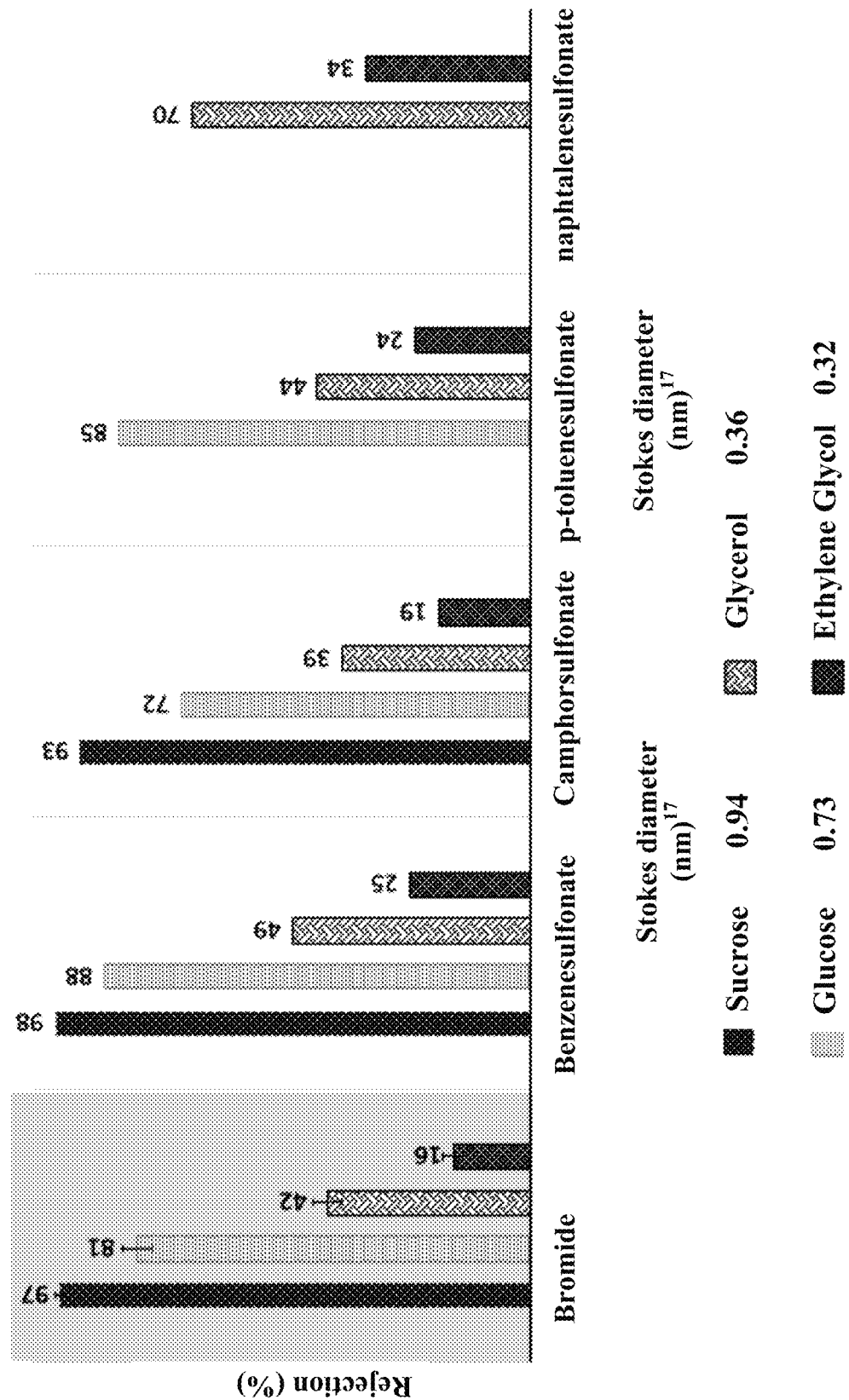
FIG. 3B comprises a bar graph illustrating showing organic solute rejection of certain anion-exchanged, cross-linked TFC $Q_I$ LLC membranes as a function of anion species associated at the pore wall. The control or baseline sample is bromide, highlighted on the left. The Stokes diameter for each of the organic solutes is given in the legend.
Figure 4:
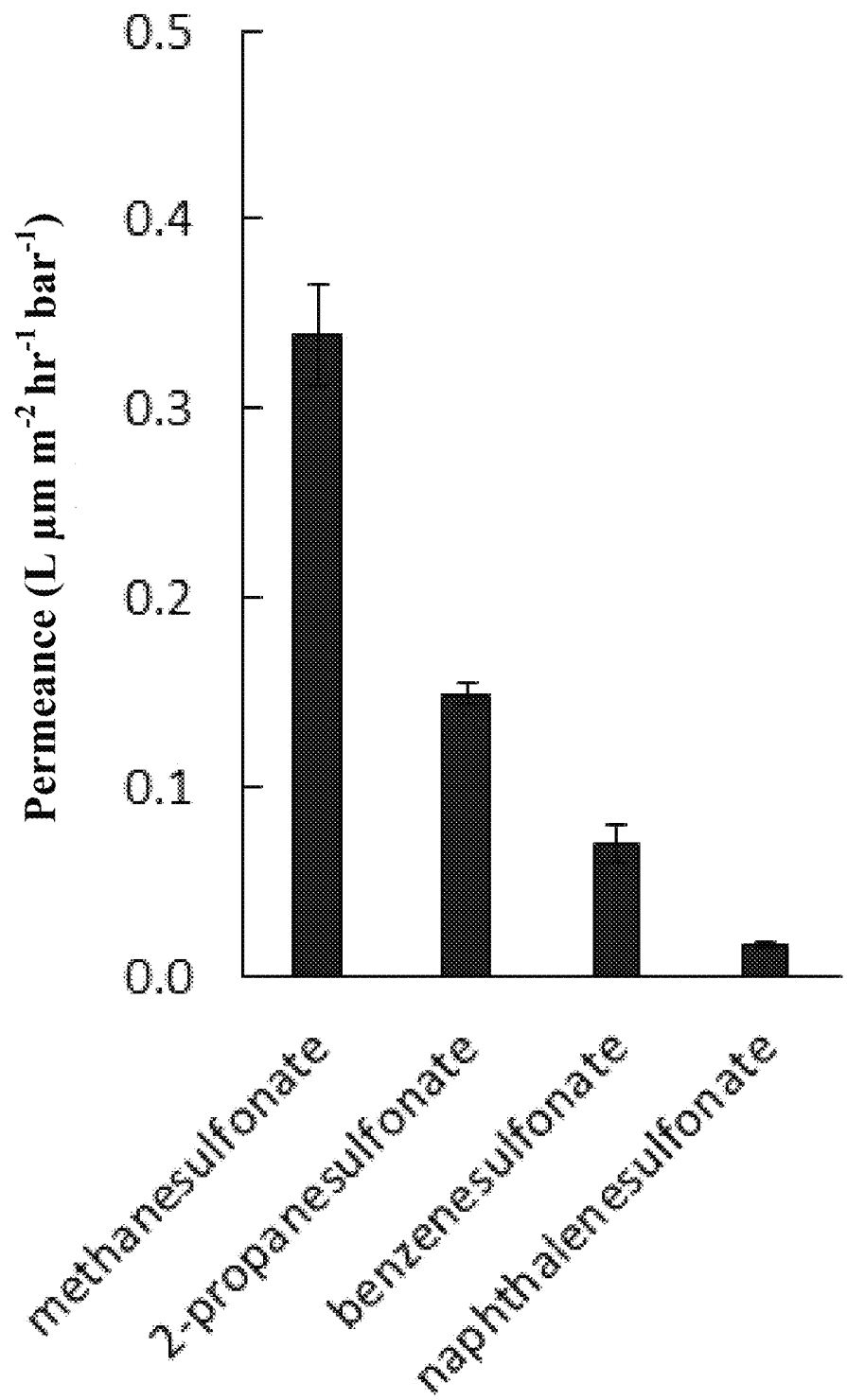
FIG. 4 comprises a bar graph illustrating average permeance values of various organosulfonate-exchanged TFC $Q_I$ membranes with approximately the same selective layer thickness. The values shown are the averages of triplicate experiments, and the error bars represent the 95% confidence interval.

The water permeance of the anion-exchanged membranes was also evaluated as a function of resident anion. Water permeance is typically inversely proportional to membrane selectivity. A more selective membrane with smaller pores should have a lower water permeance, all else being equal. This expected trend can be seen in the water permeance results in FIG. 4 for some of the organosulfonate-containing TFC $Q_I$ membranes of approximately the same thickness. TFC $Q_I$ polymer membranes that have higher rejections have correspondingly lower water permeance. This trend is not present, however, in the comparison of methanesulfonate and 2-propanesulfonate. Membranes exchanged with these two anions have the same uncharged solute selectivity (FIG. 3), but they differ greatly in their water permeance.

The comparison of the pore-manipulated TFC $Q_I$ membrane performance with commercial RO and NF membranes demonstrates that the TFC $Q_I$ membrane acts similarly to an NF membrane because it exhibits a similar trend of decreasing rejection with decreasing solute size. While the naphthalenesulfonate- and benzenesulfonate-exchanged membranes exhibited higher rejections than the commercial NF membrane for all of the solutes tested in the present study, the methanesulfonate- and 2-propanesulfonate-exchanged membranes rejected solutes to a higher or lower degree than the commercial NF membrane depending on the solute. In terms of water permeance, the permeance of an anion-exchanged TFC $Q_I$ membrane was between those of commercial NF and RO membranes, or below that of an RO membrane, depending on the resident anion. This comparison demonstrates the significant range of performance attainable by the TFC $Q_I$ membrane using facile anion-exchange.

Effective Pore Radius Calculations Using the One-Parameter Model

The one-parameter model was used to characterize the nanopore environment in a quantitative way. Since the one-parameter model describes solute rejection well in these types of $Q_I$ membranes, it was used here to elucidate the impact of the resident organosulfonate anion on the nanopore through the calculation of the effective pore radius. By taking the rejection results presented in FIG. 3A and fitting them to the one-parameter model via the effective pore radius ($r_{pore}$), one can calculate the effective pore radius (Table 6) of a membrane with a given resident anion. The standard error between the model and the experimentally observed rejection data was 0.09, indicating that the one-parameter model described the results well. Table 6 shows that the effective pore radius of the TFC $Q_I$ membrane varied significantly with the resident organosulfonate anion. The one-parameter model is one method of quantifying the selectivity of the pore. Based on the results presented in Table 6, this method can induce sub-nm variations in pore selectivity.

TABLE 6

The effective pore radius as calculated by fitting the one-parameter model to rejection results of a TFC $Q_I$ membrane anion-exchanged with the specified organosulfonate anion. The values shown are the averages of triplicate experiment, and the error bars represent the 90% confidence interval.

| Exchanged-in organosulfonate anion | Effective pore radius, $r_{pore}$ (nm) |
|---|---|
| Methanesulfonate | 0.9 ± 0.2 |
| 2-propanesulfonate | 0.9 ± 0.2 |
| Benzenesulfonate | 0.67 ± 0.04 |
| naphthalenesulfonate | 0.55 ± 0.08 |

It can be seen from the data in Table 6, in conjunction with the $V_{mol}$ values provided in Table 5, that a larger resident organosulfonate anion afforded a smaller effective pore radius. The exception to this trend is the comparison between methanesulfonate and 2-propanesulfonate. 2-Propanesulfonate has a $V_{mol}$ more similar to that of benzenesulfonate than to that of methanesulfonate (Table 5). However, a membrane exchanged with 2-propanesulfonate exhibited a selectivity more similar to a membrane exchanged with methanesulfonate than with benzenesulfonate. This discrepancy suggests that an anion's size might not be the sole predictor of pore selectivity and that non-steric interactions should be considered. An alternative approach to characterizing the nanopore environment is to correlate the resident anion's physicochemical properties with the observed solute rejection in search of a property-based relationship. A property-based approach could also provide information about the rejection performance of membranes exchanged to anions not included in this study.

Correlation of Membrane Performance with Anion Properties via Empirical Modeling An empirical model correlating the physicochemical properties of the resident anion with the solute rejection was used to characterize the nanopore environment. Hydrophobicity and size are dominant factors in determining the rejection of uncharged solutes. To evaluate the correlation between these two factors and the observed solute rejection, the rejection was plotted against these factors. Only single-term models were considered because the interest of this work was to determine if a significant correlation did exist. Single-term models demonstrated sufficient correlation to stand as proof-of-concept that such a correlation exists. The best correlation between physicochemical properties and solute rejection was not pursued because this set of data was inherently limited by the strong collinearity of size and hydrophobicity in the set of anions chosen. The single terms investigated were the individual factors themselves ($V_{mol}$ or log P) and the interaction term ($V_{mol}$·log P). The interaction term was important to include in this analysis because it includes both factors while maintaining the single-term form of the model. The simultaneous inclusion of both factors was necessary to consider given the strong collinearity between the factors.

Significant correlation was found between the observed solute rejection and the various single-term factors considered. Comparing all the single-term models via adjusted $R^2$ values, observed solute rejection correlated best with the interaction term ($V_{mol}$·log P). This was the case for all solutes except sucrose. Without wishing to be limited by any theory, it is reasonable that none of the factors strongly correlated with sucrose rejection because sucrose was already at the upper bound of rejection, and a significant change in sucrose rejection was not observed between the various resident anions (FIG. 3A). The standard error between the single-term model based on the interaction term and observed rejection for all uncharged solutes was 0.07, indicating that this model describes the observations well.

Figure 5:
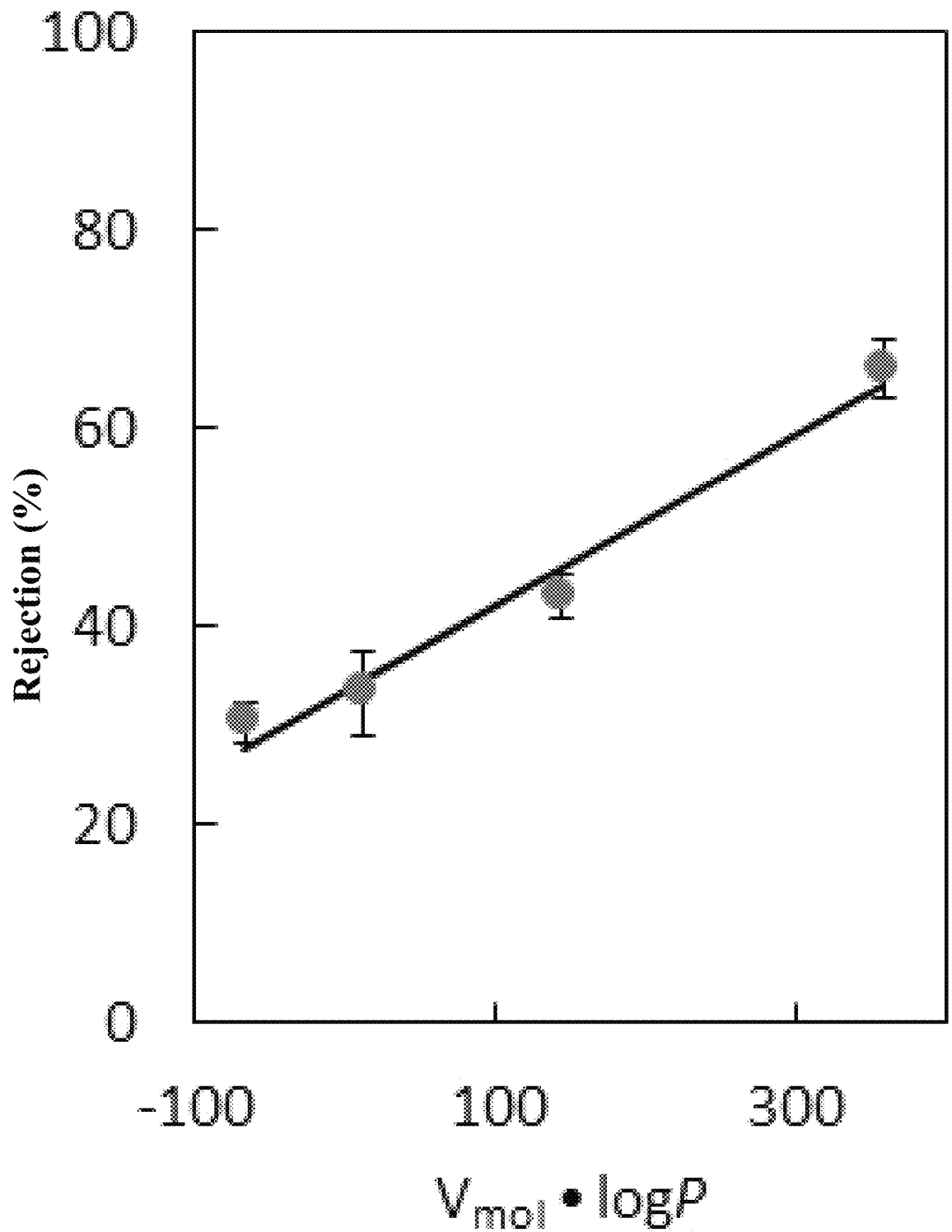
FIG. 5 comprises a graph illustrating glycerol rejection vs. ($V_{mol}$·log P) of the organosulfonate anion-exchanged into the TFC $Q_I$ membranes, showing an empirical relationship of rejection values with the interaction of these two parameters. The data points shown represent the average of triplicate experiments, and the error bars represent the 95% confidence interval.

The quality of fit, as represented by the adjusted $R^2$ value, varies with solute. The best correlation was found with glycerol, which falls in the middle of the rejection range at about 50%. Experimentally observed solute rejection and the empirical model are presented in FIG. 5 to visually represent the quality of fit. The adjusted $R^2$ values for all single-term models describing the rejection of all solutes is provided elsewhere herein. The variation in quality of fit with solute agrees with the importance of solute-membrane interaction on rejection. Solutes vary in their physicochemical properties just as the resident anions do, causing the interaction between solute and membrane to look slightly different for each solute. Similarly, the physicochemical properties of solutes and water differ. The empirical approach was used to model the variation in water flux with resident anion properties. In the case of water flux, however, the factor of highest correlation with the observed flux was $V_{mol}$. The deviation of water flux's correlation to $V_{mol}$ rather than the interaction term, as in the case of the solutes, supports the observation made elsewhere herein that water permeance does not follow the same trend as solute rejection.

The existence of a trend between resident anion properties and response (i.e., solute rejection) moves this type of manipulation of membrane performance from a library-based approach to a property-based approach. A library-based approach requires an extensive library of all possible anions in order to find the right resident anion to induce a desired membrane performance. Meanwhile, a property-based approach uses information from previous experiments in order to predict which anion will induce the desired membrane performance based on the anion's properties. Such an approach coupled with a set of organosulfonate anions not characterized by the collinearity present here could also contribute significantly to the understanding of solute and solvent transport within the nanopore environment. The correlation presented here is specific to the family of organosulfonate anions and might vary for other families of anions. However, as long as a correlation can be found within an anion family, this approach can offer insight about that anion family. A property-based approach contributes to the development of designable materials for NF applications.

Example 7

Selected Anions of Interest

Figure 17:
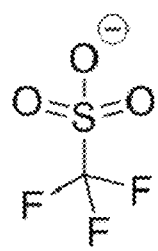
Figure 17:
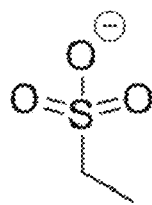
Figure 17:
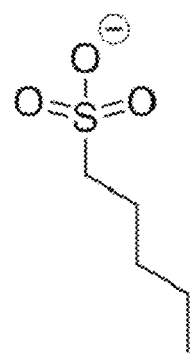
Figure 17:
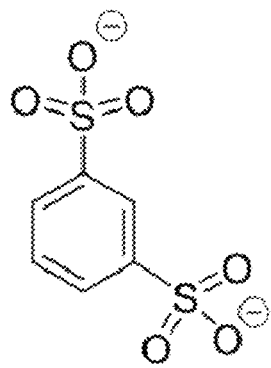
Figure 17:
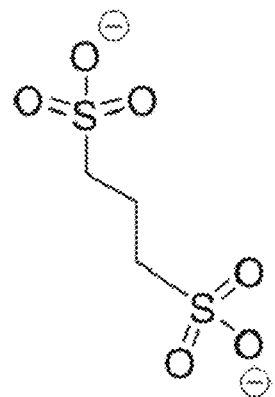
Figure 18:
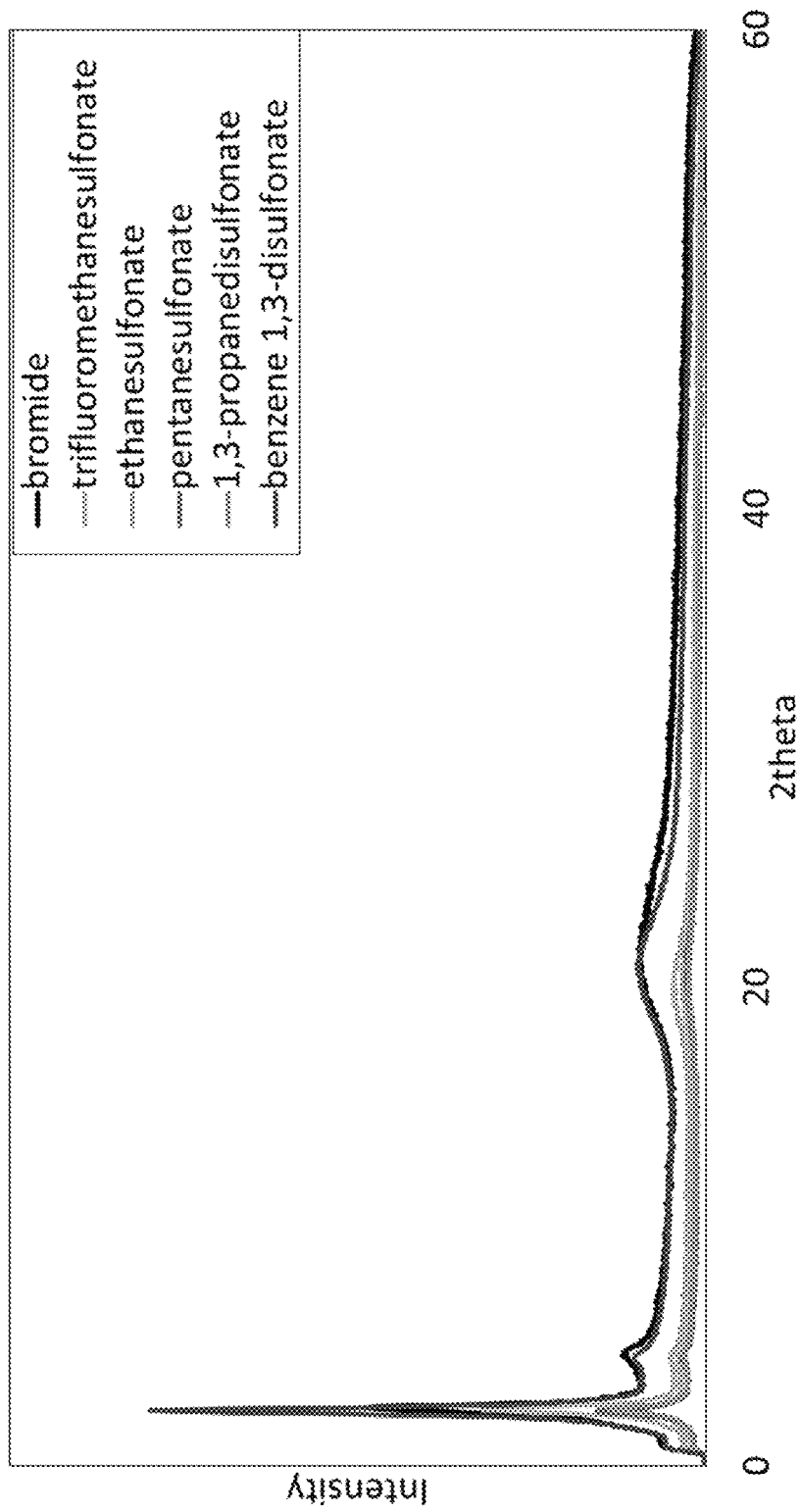
FIG. 18 comprises a graph illustrating PXRD spectra of bulk films showing the profiles of the initial control $Q_I$ film of 2a containing bromide before any anion-exchange, and the films exchanged to the organosulfonate anions shown in FIG. 17.
Figure 19:
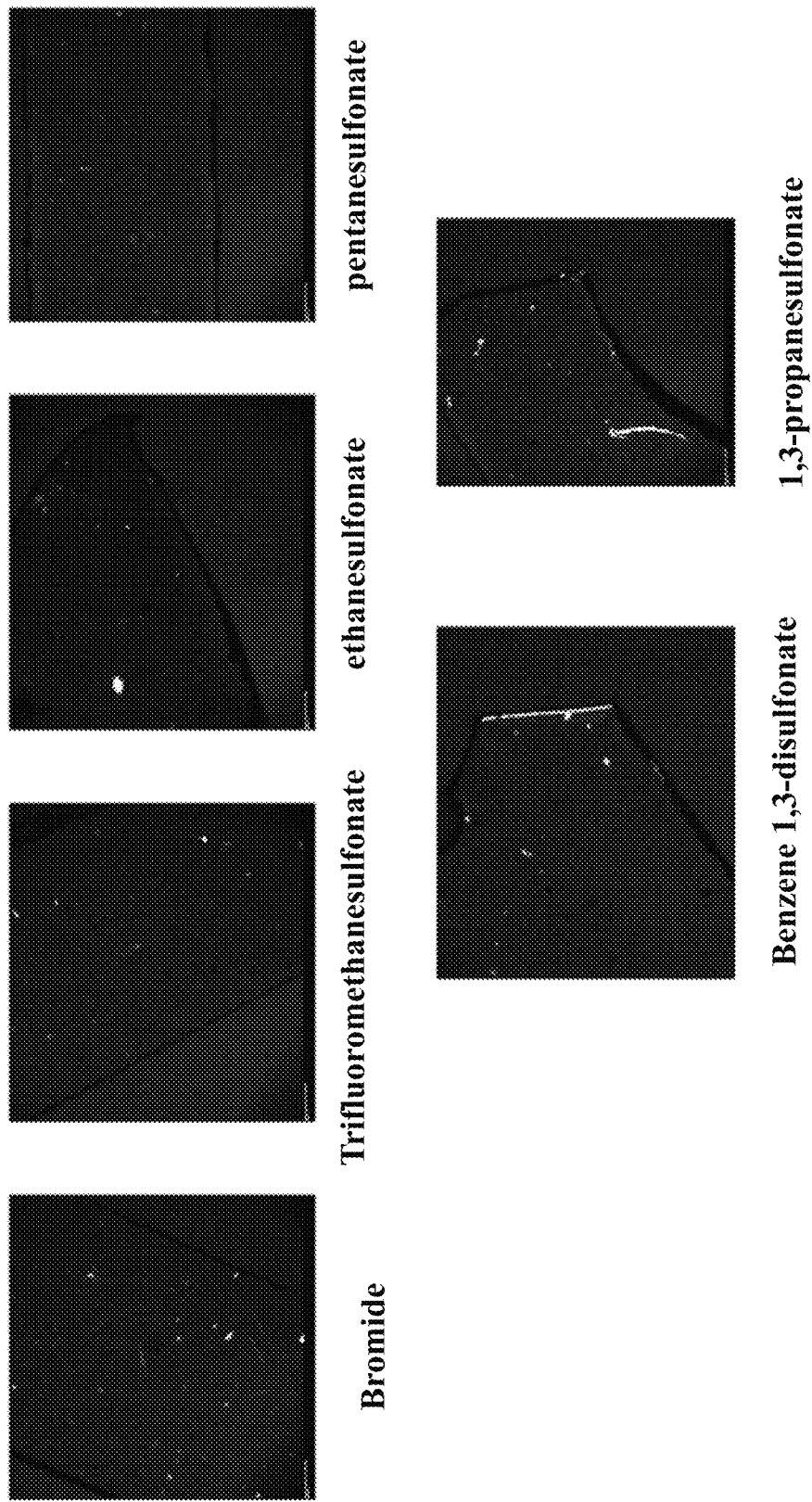
FIG. 19 comprises PLM images for a control $Q_I$ polymer film of 2a containing bromide, and for bulk films exchanged to the organosulfonate anions presented in FIG. 17.

In addition to non-limiting anions investigated elsewhere herein, additional non-limiting anions have been exchanged in the $Q_I$ phase in order to study the impact of their association at the cationic pore wall on the selectivity of the TFC $Q_I$ membrane based on monomer 2a. Table 7 presents anions that have been completely exchanged into the polymerized bulk $Q_I$ film, and FIG. 17 provides their chemical structures. Methods for anion-exchange and film characterization are the same as those listed elsewhere herein. FIG. 18 and FIG. 19 present the PXRD and PLM characterization of these exchanged films, respectively, demonstrating that the cubic phase of the film was maintained after exchange to each of the anions investigated. All films were analyzed with EDS and confirmed to contain less than 1 wt % Br, suggesting complete anion exchange.

TABLE 7

Conditions (concentration and salt soak duration) used to induce complete anion-exchange of the bulk $Q_I$ films for each organosulfonate anion used.

| Anion | Aq. Soak Solution Concentration (M) | Soak Duration (days) |
|---|---|---|
| bromide (control) | 0 | 2 |
| trifluoromethanesulfonate | 0.2 | 3 |
| ethanesulfonate | 0.2 | 3 |
| pentanesulfonate | 0.2 | 3 |
| 1,3-propanedisulfonate | 0.2 | 3 |
| benzene 1,3-disulfonate | 0.5 | 3 |

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of modifying the effective pore size or a solute transport of a nanoporous lyotropic liquid crystal (LLC) polymer membrane, the method comprising:
   providing a membrane comprising a cationic LLC polymer and at least one first anionic counterion,
      wherein the LLC polymer-comprising membrane comprises at least one pore in which the at least one first anionic counterion is located, and
      wherein the effective size of the at least one pore is less than about 2 nm, and
   reversibly replacing the at least one first anionic counterion by contacting the at least one first anionic counterion with an aqueous solution of at least one second anionic counterion at room temperature,
      wherein the effective pore size or solute rejection of the membrane comprising the at least one first anionic counterion is distinct from that comprising the at least one second anionic counterion.

2. The method of claim 1, wherein the at least one first anionic counterion has a distinct molecular volume ($V_{mol}$) from the at least one second anionic counterion.

3. The method of claim 1, wherein the membrane comprising the at least one second anionic counterion has distinct % rejection for an uncharged solute than the membrane comprising the at least one first anionic counterion.

4. The method of claim 3, wherein the Stokes diameter of the uncharged solute is approximately equal to the effective pore radius for the membrane comprising the at least one second anionic counterion.

5. The method of claim 1, wherein the at least one anionic counterion is selected from the group consisting of linear, cyclic, or branched $C_1$-$C_6$ alkanesulfonate, benzenesulfonate, naphthalenesulfonate, trifluoromethanesulfonate, camphorsulfonate, alkyl- or aromatic carboxylates, alkyl phosphonates, and aromatic phosphonates, each of which is optionally independently substituted with at least one substituent selected from the group consisting of $C_1$-$C_6$ alkyl, $C_1$-$C_6$ haloalkyl, $C_1$-$C_6$ haloalkoxy, fluoro, chloro, bromo, iodo, cyano, nitro, —SR', —C(=O)R', —N(R')(R'), —OR', —C(=O)OR', and C(=O)NR'R', wherein each occurrence of R' is independently H or $C_1$-$C_6$ alkyl.

6. The method of claim 1, wherein the at least one pore has a structure selected from the group consisting of type I bicontinuous cubic ($Q_I$) LLC phase structure, and inverted hexagonal ($H_{II}$) LLC phase structure.

\* \* \* \* \*